(12) United States Patent
Ohmura et al.

(10) Patent No.: US 7,542,783 B2
(45) Date of Patent: Jun. 2, 2009

(54) PORTABLE COMMUNICATION TERMINAL

(75) Inventors: Hiroshi Ohmura, Asaka (JP); Ko Aosaki, Asaka (JP); Hiroyuki Uchiyama, Asaka (JP); Seiji Takada, Asaka (JP); Hiroshi Soma, Asaka (JP); Chiaki Fujii, Asaka (JP); Seimei Ushiro, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 897 days.

(21) Appl. No.: 10/815,802

(22) Filed: Apr. 2, 2004

(65) Prior Publication Data

US 2004/0185914 A1 Sep. 23, 2004

Related U.S. Application Data

(62) Division of application No. 09/803,657, filed on Mar. 12, 2001, now Pat. No. 7,020,493.

(30) Foreign Application Priority Data

Mar. 10, 2000 (JP) ............................ 2000-067533

(51) Int. Cl.
*H04B 1/38* (2006.01)
(52) U.S. Cl. .................................... 455/557; 455/556.1
(58) Field of Classification Search ............. 455/550.1, 455/556.1, 556.2, 557, 558, 559
See application file for complete search history.

(56) References Cited

U.S. PATENT DOCUMENTS

| 5,893,037 | A | | 4/1999 | Reele et al. |
|---|---|---|---|---|
| 5,940,767 | A | * | 8/1999 | Bourgeois et al. ............ 455/466 |
| 5,964,847 | A | * | 10/1999 | Booth et al. .................... 710/1 |
| 6,181,954 | B1 | | 1/2001 | Monroe et al. |
| 6,201,548 | B1 | | 3/2001 | Cariffe et al. |
| 6,241,351 | B1 | * | 6/2001 | Stephenson ................. 347/109 |
| 6,243,596 | B1 | | 6/2001 | Kikinis |
| 6,266,539 | B1 | * | 7/2001 | Pardo ....................... 455/556.2 |
| 6,317,609 | B1 | | 11/2001 | Alperovich et al. |
| 6,337,914 | B1 | | 1/2002 | Phillipps |
| 6,405,055 | B1 | * | 6/2002 | Silverbrook et al. ...... 455/556.1 |
| 6,427,078 | B1 | | 7/2002 | Wilska et al. |
| 6,480,724 | B1 | | 11/2002 | Erkkilä et al. |
| 6,510,325 | B1 | | 1/2003 | Mack, II et al. |
| 7,236,271 | B2 | * | 6/2007 | Silverbrook ................ 358/473 |
| 7,239,891 | B2 | * | 7/2007 | Hollstrom et al. ......... 455/556.1 |
| 7,286,260 | B2 | * | 10/2007 | Silverbrook ................ 358/1.8 |
| 2003/0054859 | A1 | * | 3/2003 | Goto ........................... 455/557 |
| 2004/0166895 | A1 | * | 8/2004 | Koenck et al. ............ 455/556.1 |

FOREIGN PATENT DOCUMENTS

| DE | 4411716 A1 | * | 10/1995 |
|---|---|---|---|
| JP | 10-200960 | | 7/1998 |
| WO | 98/39906 A1 | | 9/1998 |

* cited by examiner

*Primary Examiner*—Blane J Jackson
(74) *Attorney, Agent, or Firm*—Sughrue Mion, PLLC

(57) ABSTRACT

A cellular phone has a black-and-white LCD that displays characters and communication information and a color LCD that displays an image. The image and the characters are displayed on the separate LCDs. Thus, the characters are not superimposed on the image, and they are easy to see. When the image is not needed (the user is not using the phone or the user is talking on the phone), only the black-and-white LCD displays the characters and the color LCD is turned off to save energy.

8 Claims, 32 Drawing Sheets

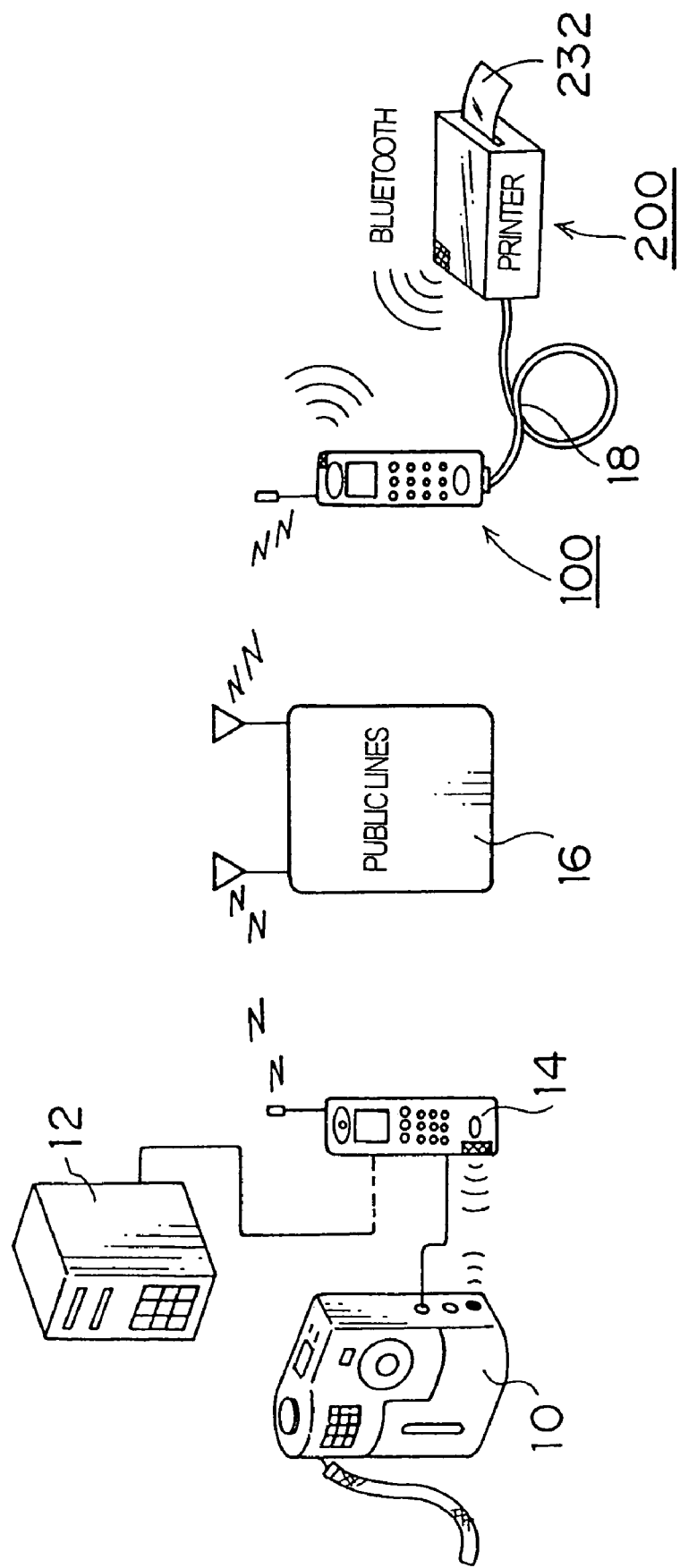

F I G. 3
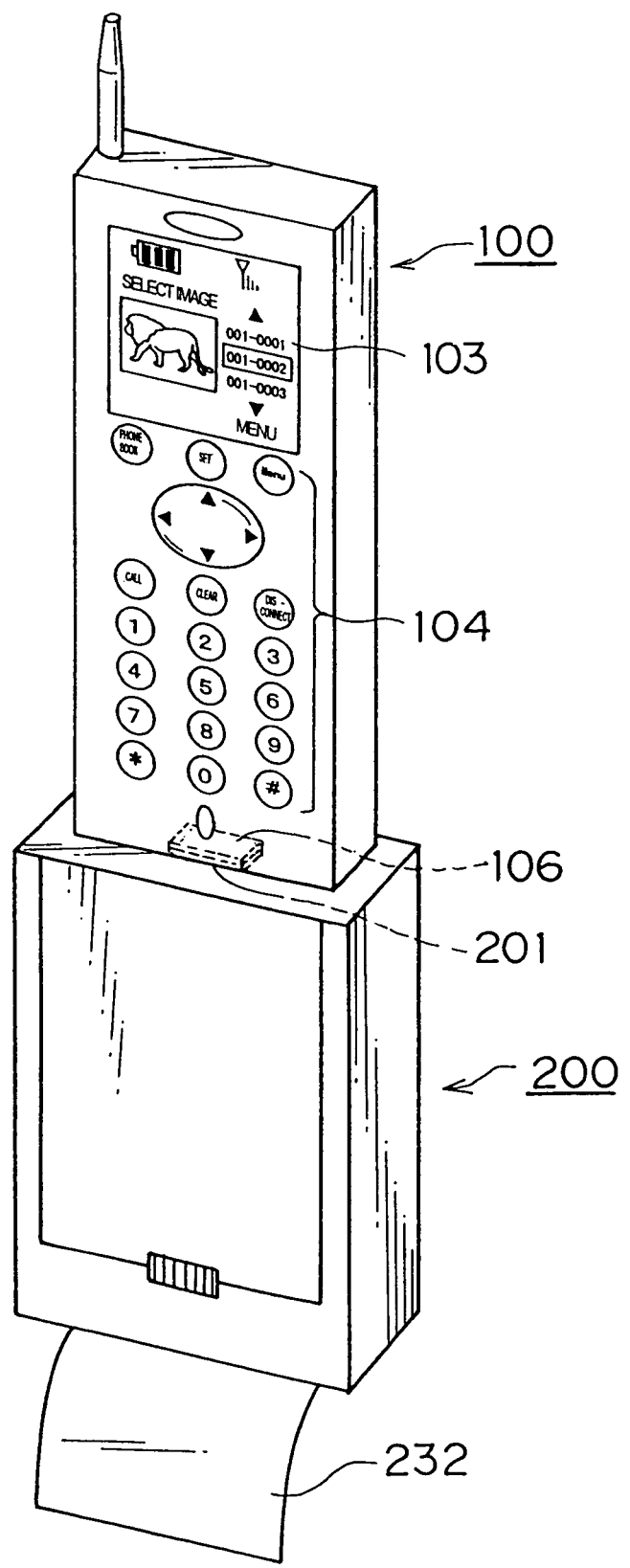

F I G. 6
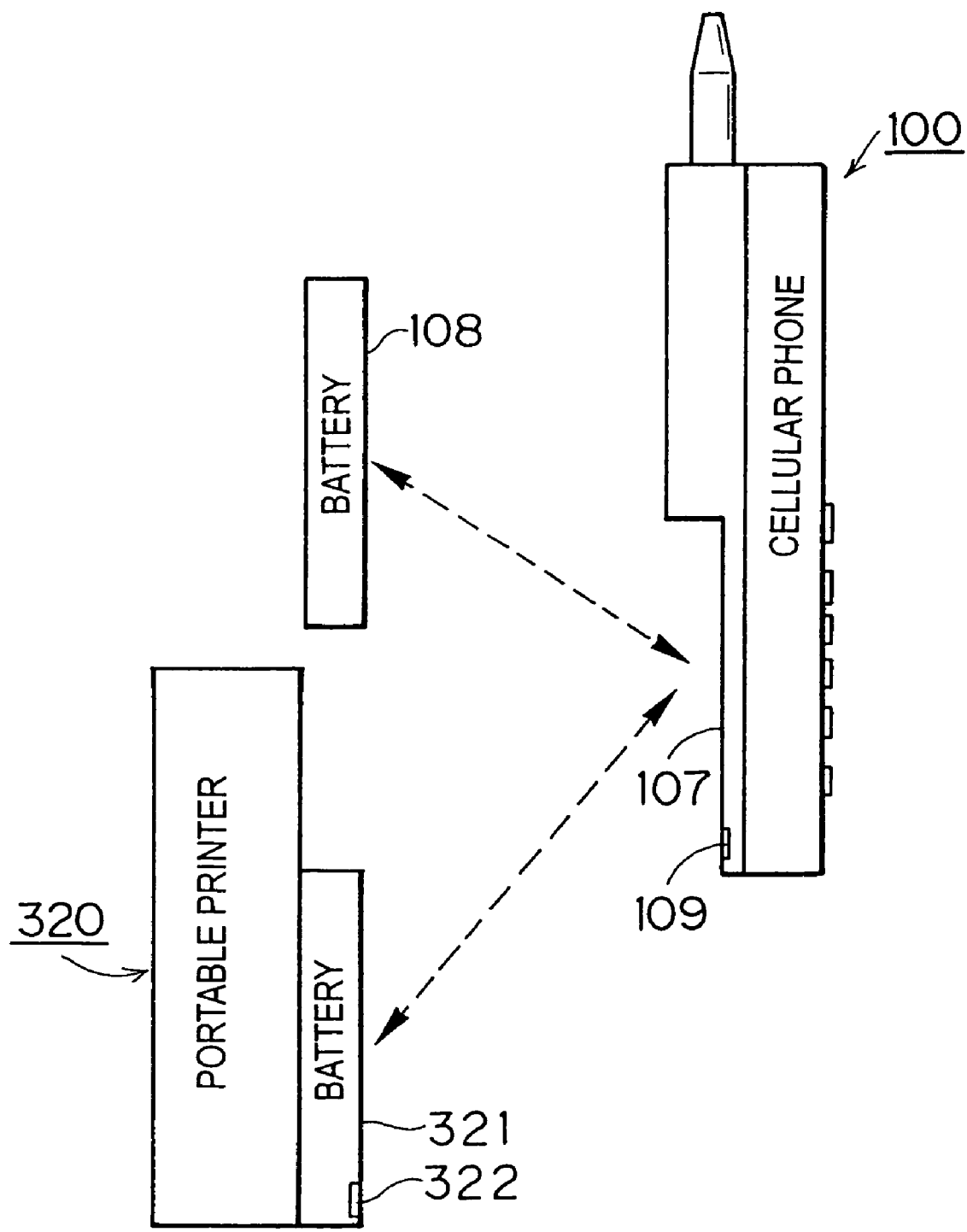

F I G. 1 2
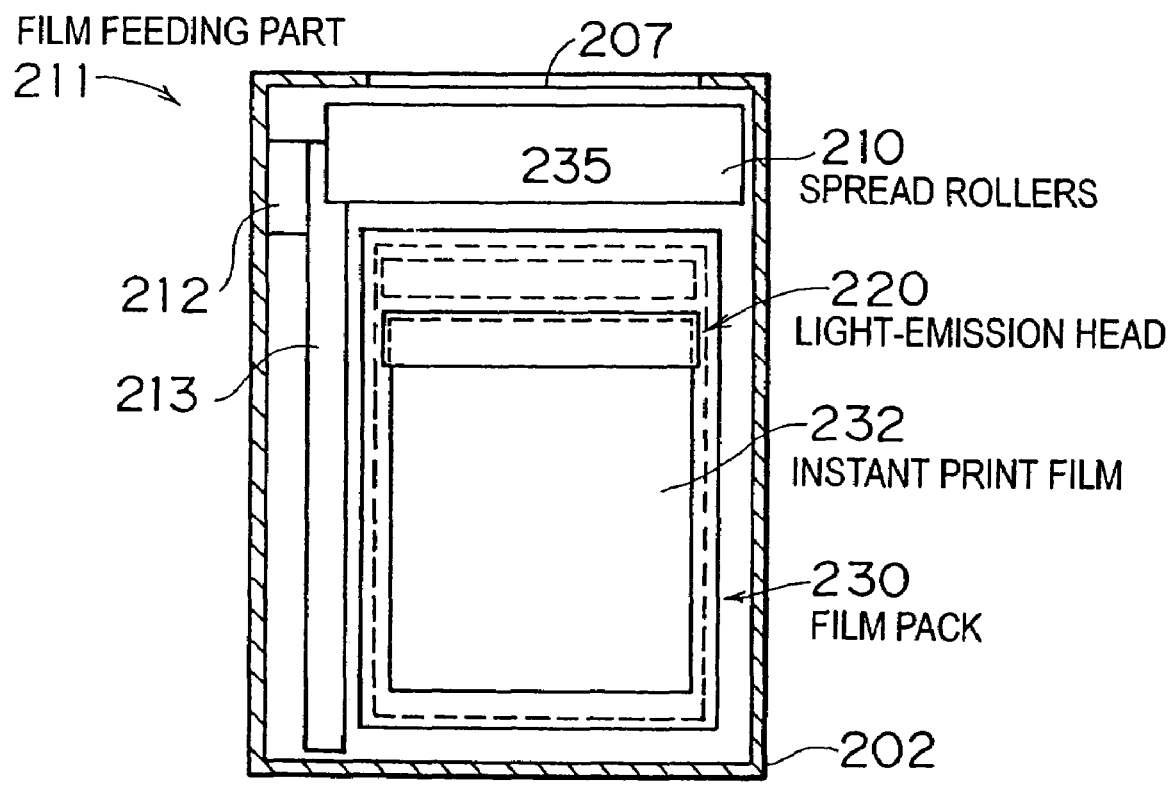

F I G. 1 3
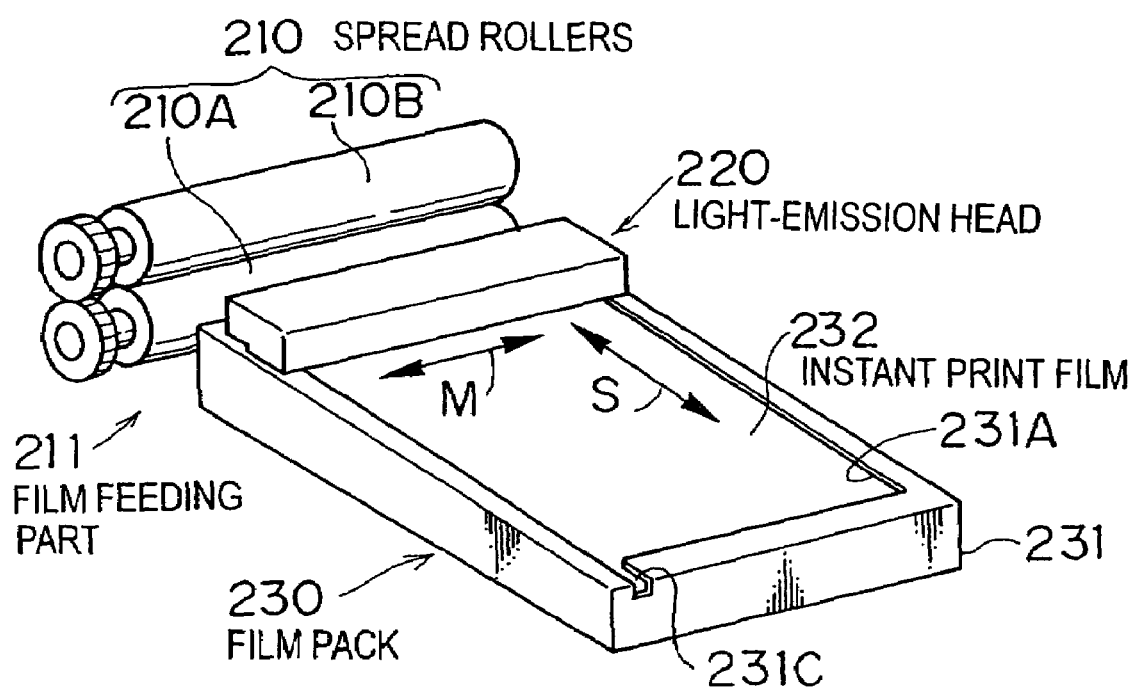

F I G. 1 5
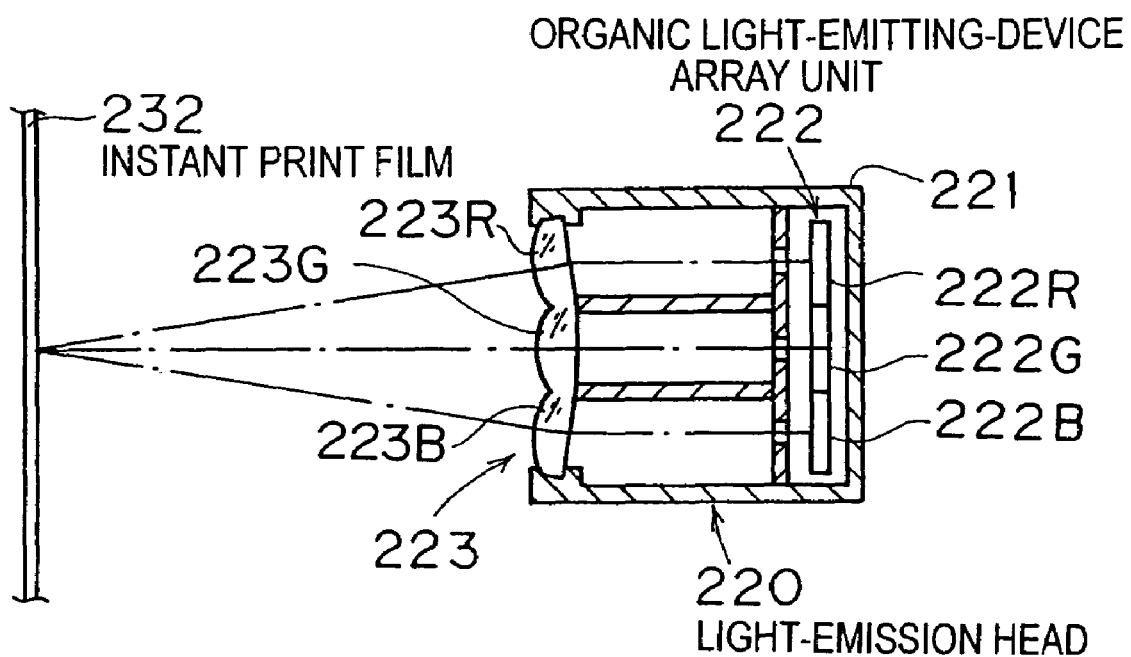
F I G. 1 6
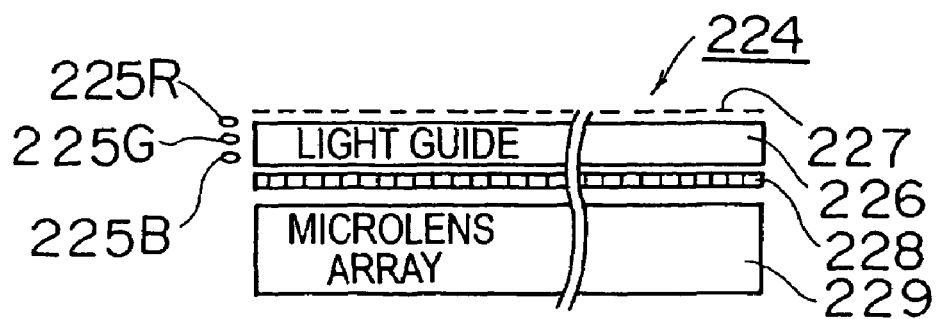

F I G. 1 7
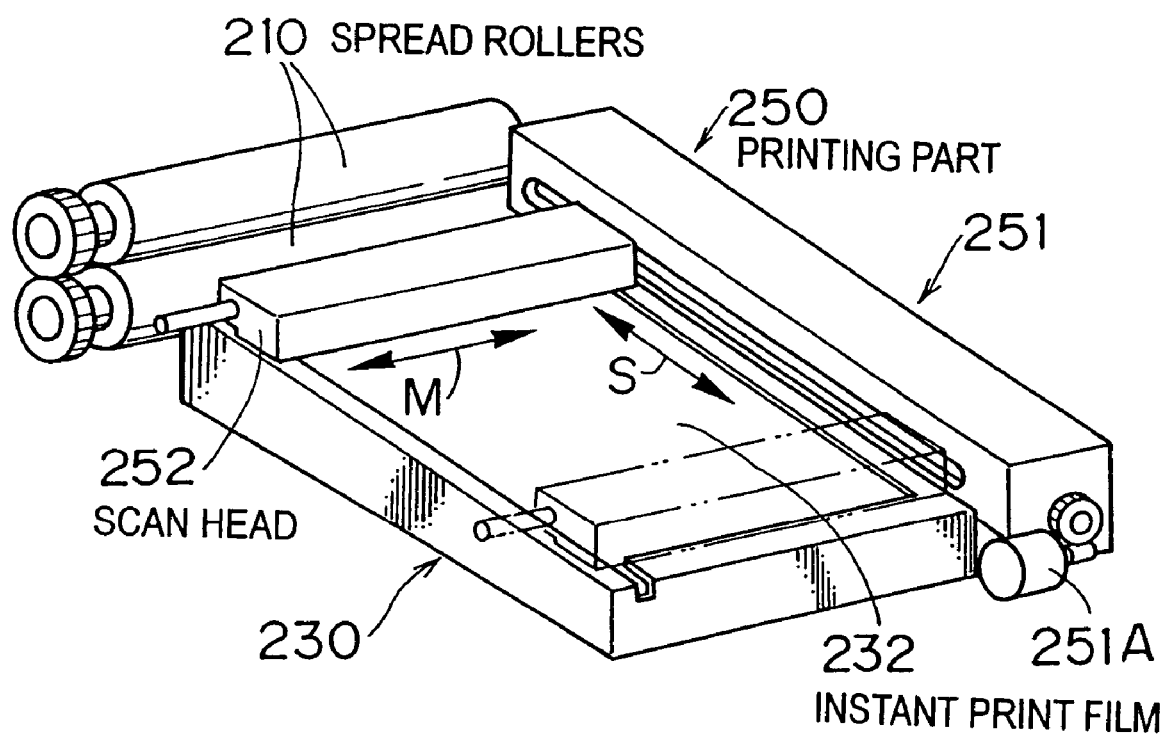

F I G. 1 9
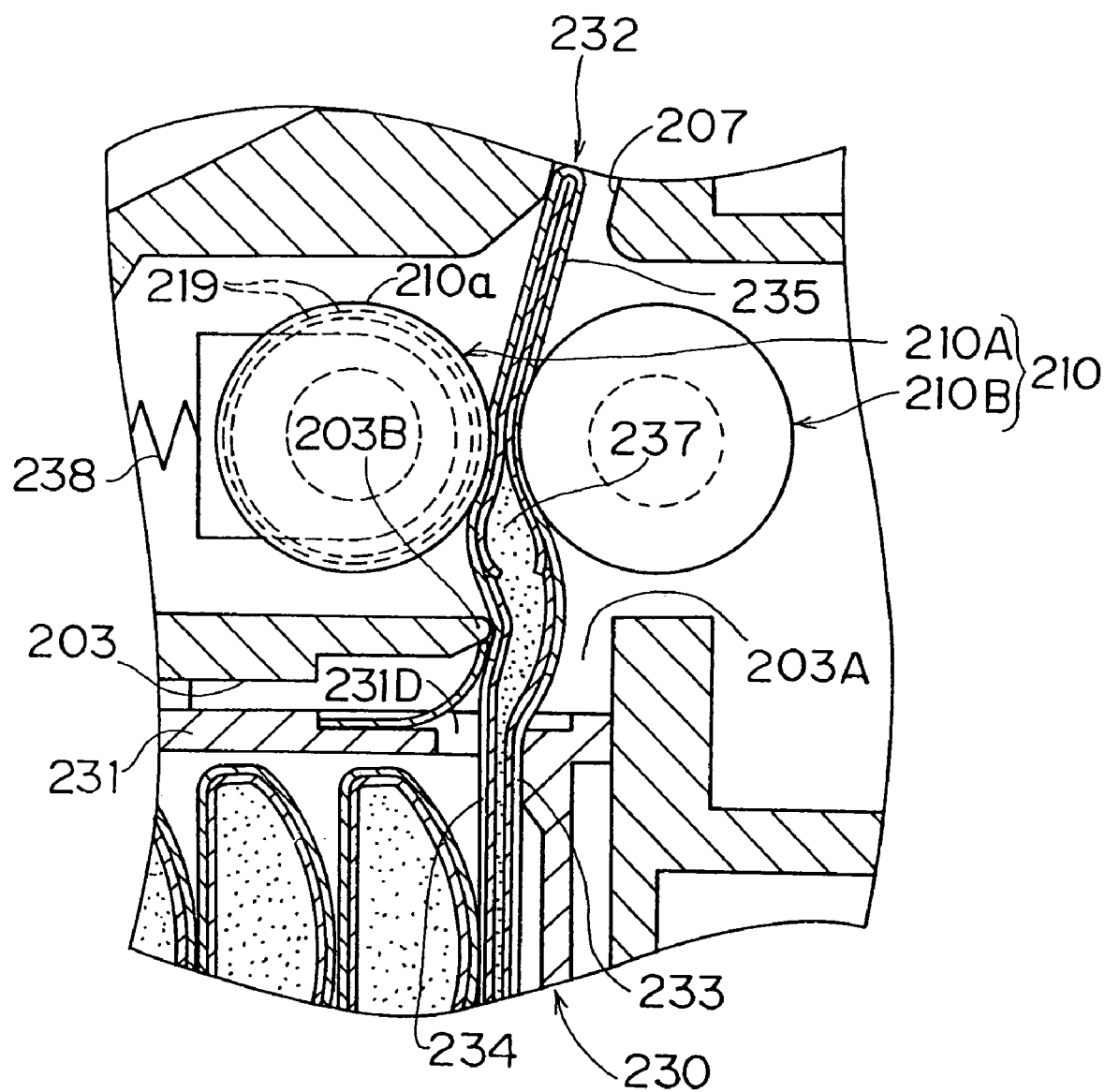

F I G. 2 4 (A) NUMBER OF PRINTS 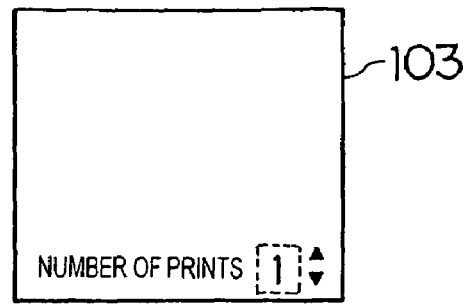
F I G. 2 4 (B) ZOOMING 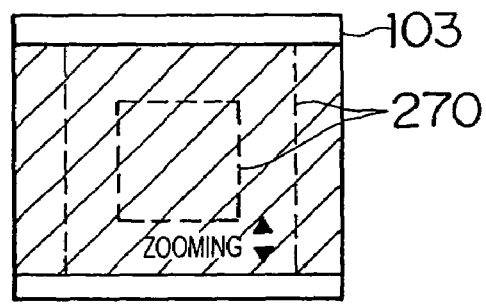
F I G. 2 4 (C) TRIMMING 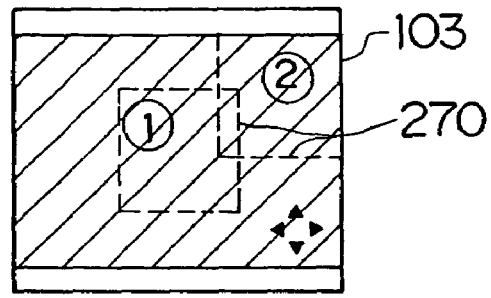
F I G. 2 4 (D) BRIGHTNESS 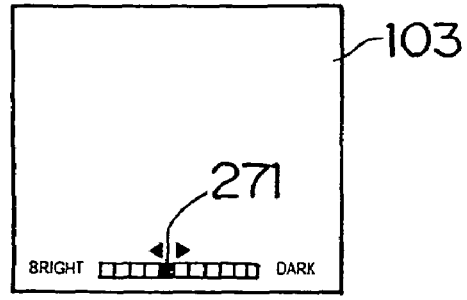
F I G. 2 4 (E) CHROMATICITY 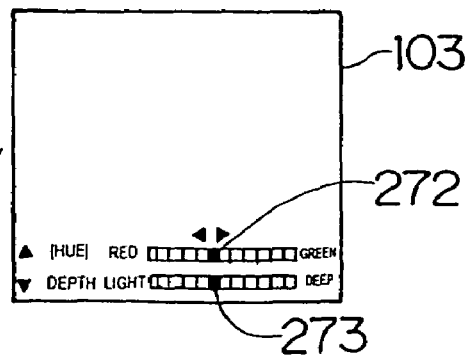

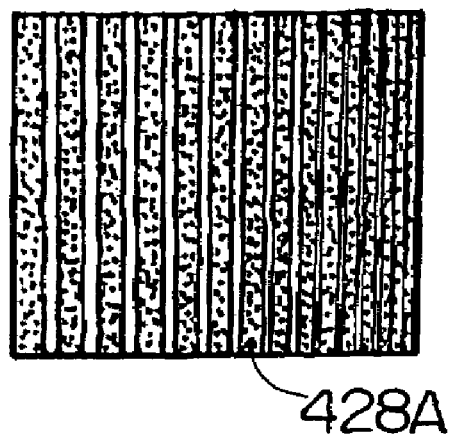
F I G. 3 2 (A)
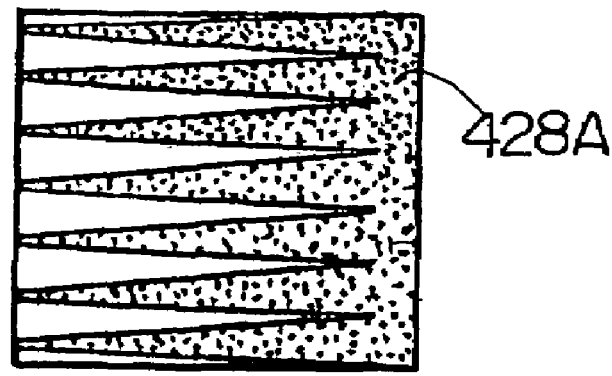
F I G. 3 2 (B)

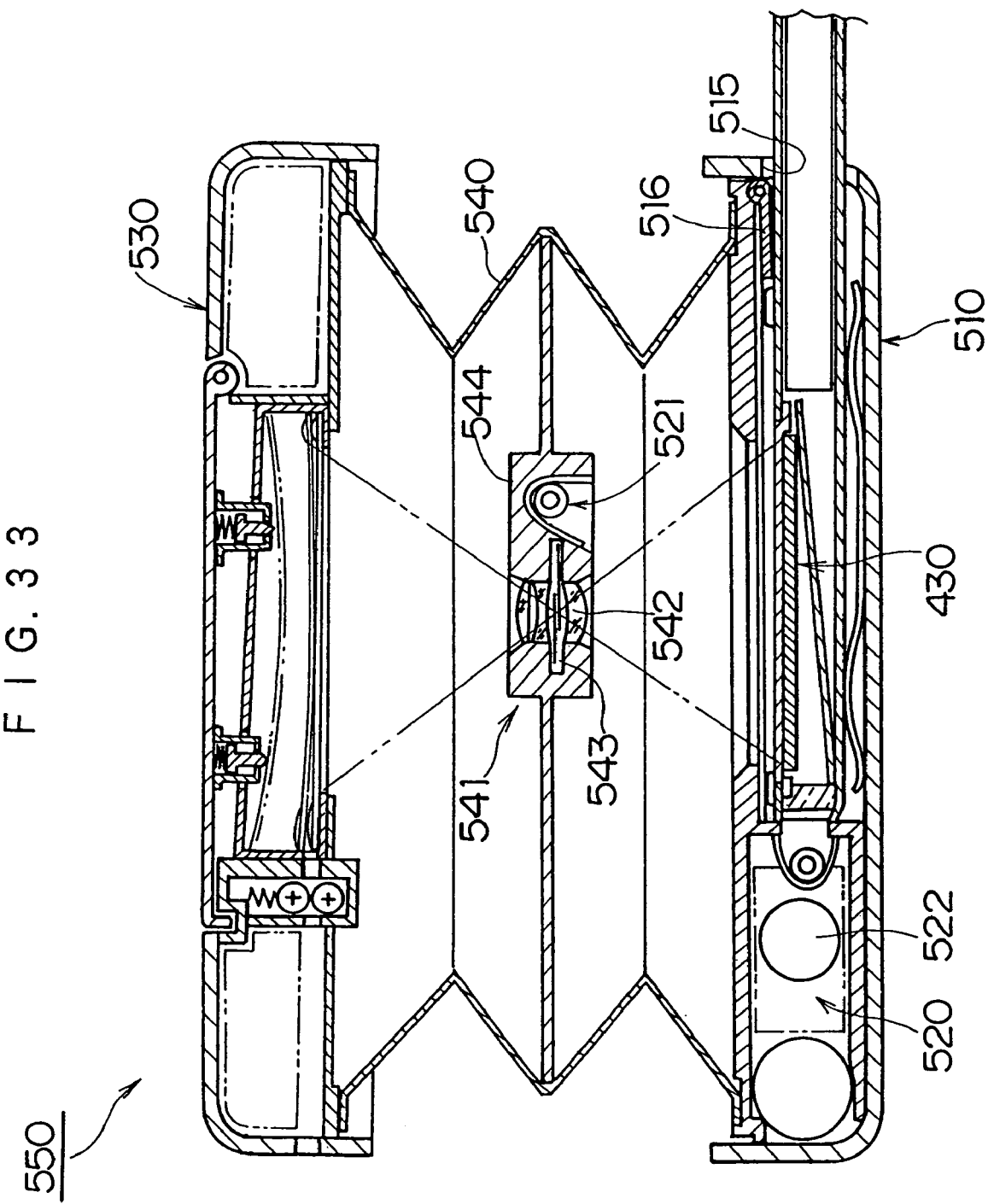

PORTABLE COMMUNICATION TERMINAL

This is a divisional of application Ser. No. 09/803,657 filed Mar. 12, 2001 now U.S. Pat. No. 7,020,493; the disclosure of which is incorporated herein by reference.

BACKGROUND OF THE INVENTION

1. Field of the Invention

The present invention generally relates to a portable communication terminal, and more particularly to a portable communication terminal, such as a cellular phone, that can transmit and receive image data and character data.

2. Description of Related Art

Recently, mobile communication technology using cellular phones, etc. has been developed, and the cellular phones have had multiple functions. They have been capable of inputting and outputting image data and character data. Also, cellular phones that can be used as Video phones have been developed.

A cellular phone that can transmit and receive image data and character data needs to display a lot of information such as an image, characters, communication information, etc. on its liquid crystal display. However, the liquid crystal display of the cellular phone is so small that all the information can not be displayed.

If a large display is provided on the cellular phone to address this problem, the display consumes a large amount of power. If the characters are superimposed on the image, the image and the characters are not easy to see.

SUMMARY OF THE INVENTION

The present invention has been developed in view of the above-described circumstances, and has as its object the provision of an inexpensive portable communication terminal, such as a cellular phone, that can display an easy-to-see image, characters, etc. and save electricity.

To achieve the above-described object, the present invention is directed to a portable communication terminal, comprising: a communicating device that transmits and receives image data and character data; a storage device that stores image data and character data received by the communicating device; an image displaying device and a character displaying device that display an image and characters according to the image data and the character data stored in the storage device, respectively; and a display control device that controls the displays of the image displaying device and the character displaying device. The image and the characters are displayed on the separate displaying device, and thus the characters are not superimposed on the image to make them easy to see.

The portable communication terminal comprises an imaging device, and the display control device makes the image displaying device display the image according to the image data stored in the storage device or display an image captured by the imaging device. The portable communication terminal comprises a character inputting device, and the display control device makes the image displaying device display the characters according to the character data or display characters inputted by the character inputting device.

The image displaying device is color and the character displaying device is black-and-white, and a resolution of the character displaying device is lower than that of the image displaying device. The character displaying device is less expensive than the image displaying device to reduce the cost. Characters are generally easy to read on a black-and-white display, and they do not need the same resolution as images do.

The display control device makes both the image displaying device and the character displaying device work, or makes one of them work and turns off the other one according to a state of the portable communication terminal. When the image is not needed, only the character displaying device displays the characters and the image displaying device is turned off to save energy.

The portable communication terminal has a telephone function, a Video phone function or an electronic camera function.

The portable communication terminal further comprises a first connecting device connected to a printer, and an outputting device that outputs the image data of the image displayed on the image displaying device to the printer through the first connecting device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a conceptual diagram of a system to which the present invention is applied;

FIG. 3 is a perspective view showing a state in which the cellular phone is lengthwise connected to a portable printer;

FIG. 6 is a side view showing a state in which the cellular phone is widthwise connected to a portable printer;

FIG. 12 is an explanatory view showing the structure of the portable printer;

FIG. 13 is a perspective view of a print part of the portable printer;

FIG. 15 is a section of a light-emission head of the portable printer;

FIG. 16 is a section of another light-emission head that may be used in the portable printer;

FIG. 17 is a perspective view of a print part with a scan head;

FIG. 19 is a section of an essential part of the spread mechanism of the portable printer;

FIGS. 24(A), 24(B), 24(C), 24(D) and 24(E) are diagrams showing screens displayed on an LCD of the cellular phone at the printing;

FIGS. 32(A) and 32(B) are diagrams showing reflectors of the portable printer; and FIG. 33 is a section showing another portable printer.

DETAILED DESCRIPTION OF THE PREFERRED EMBODIMENT

Figure 2:
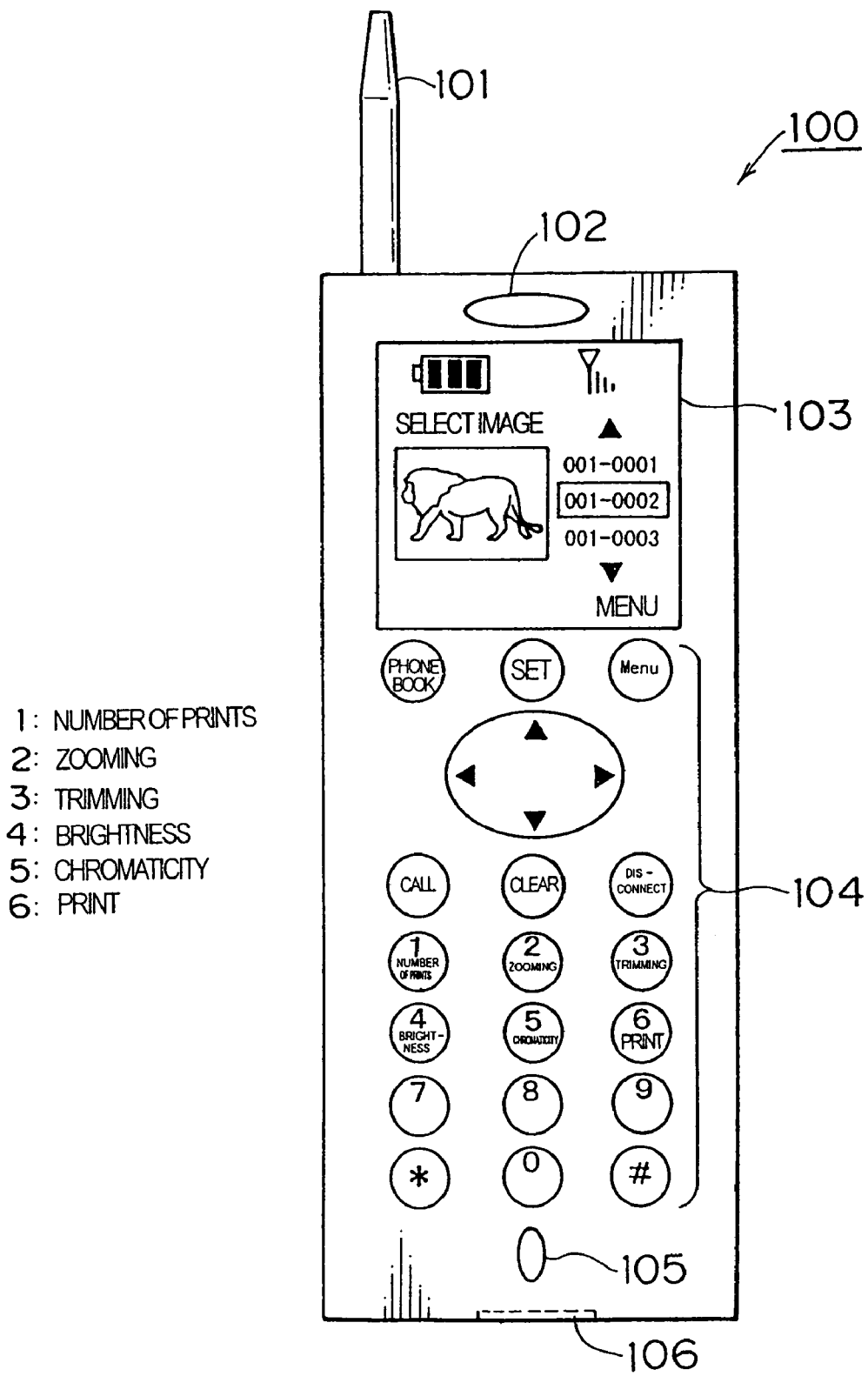
FIG. 2 is a front view of a cellular phone in FIG. 1.

Hereunder the preferred embodiment of the present invention is explained in detail according to the accompanying drawings.

FIG. 1 is a conceptual diagram of a system to which the present invention is applied. Image data captured by a digital camera 10 or image or character data stored in a server 12 is transmitted to a cellular phone 14 by wire or wireless. The cellular phone 14 communicates with a cellular phone 100 (a portable communication terminal) through public lines 16, and transmits the image data or the character data to the cellular phone 100.

In case the cellular phone 14 has a camera function, image data captured by the cellular phone 14 can be transmitted to the cellular phone 100. Also, character data inputted with the cellular phone 14 can be transmitted to the cellular phone 100.

The cellular phone 100 is connected to a portable printer 200 through a communication cable 18, or they can be connected by a wireless communication protocol (for example, Bluetooth for short-distance low-electricity-consumption communication), or they can be directly connected to each other.

FIG. 2 is a front view of the cellular phone 100 in FIG. 1. An antenna 101 for communicating with the public lines by wireless is provided on the top of the cellular phone 100; and a receiver 102 that outputs sound, a liquid crystal display (LCD) 103 that displays communication information, an image, characters and so on, push buttons 104 that designates a telephone number, characters and an image, and a transmitter 105 that inputs sound are provided on the front of the cellular phone 100; and a connector 106 for communicating with an outside apparatus is provided on the bottom of the cellular phone 100.

The portable printer 200 is a light pocket-sized printer, and it works on a battery. It does not have a display part, a control part, etc. to make it simple and inexpensive. It uses an instant print film 232, and the length and width of a print are 2 to 10 cm.

The image data, character data or the like is transmitted from the cellular phone 100 to the portable printer 200 according to the operation of the cellular phone 100, and the portable printer 200 prints the image or characters on the instant print film 232.

FIGS. 3, 4, 5, 6 and 7 are appearance views showing connections of the cellular phone 100 to various portable printers.

Figure 4:
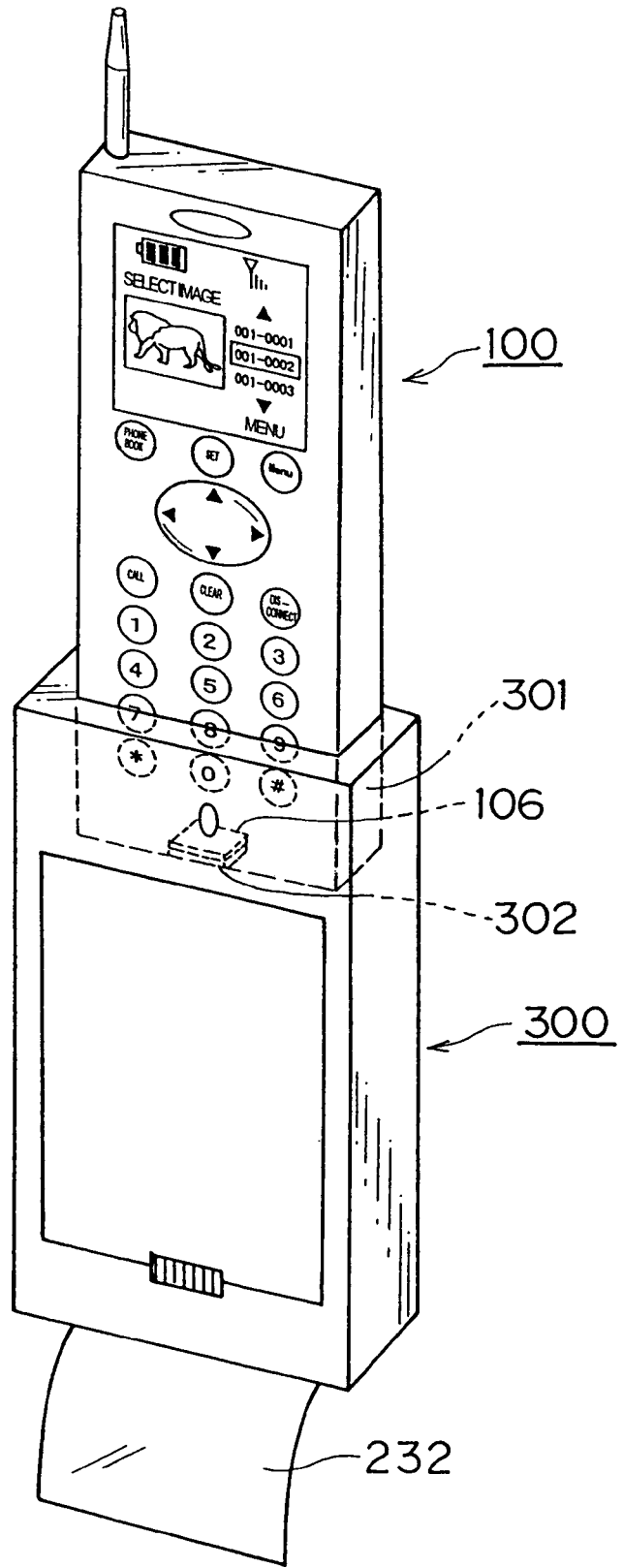
FIG. 4 is a perspective view showing a state in which the cellular phone is lengthwise connected to a portable printer.

In FIGS. 3 and 4, the cellular phone 100 is lengthwise connected to the portable printer 200 and a portable printer 300, respectively. In FIG. 3, the connector 106 provided on the bottom of the cellular phone 100 is directly connected to a connector 201 provided on a side, opposite from a film ejecting side, of the portable printer 200.

In FIG. 4, the bottom part of the cellular phone 100 is inserted into a recess 301 of the portable printer 300, and the connector 106 provided on the bottom of the cellular phone 100 is directly connected to a connector 302 provided on the bottom of the recess 301.

Figure 5:
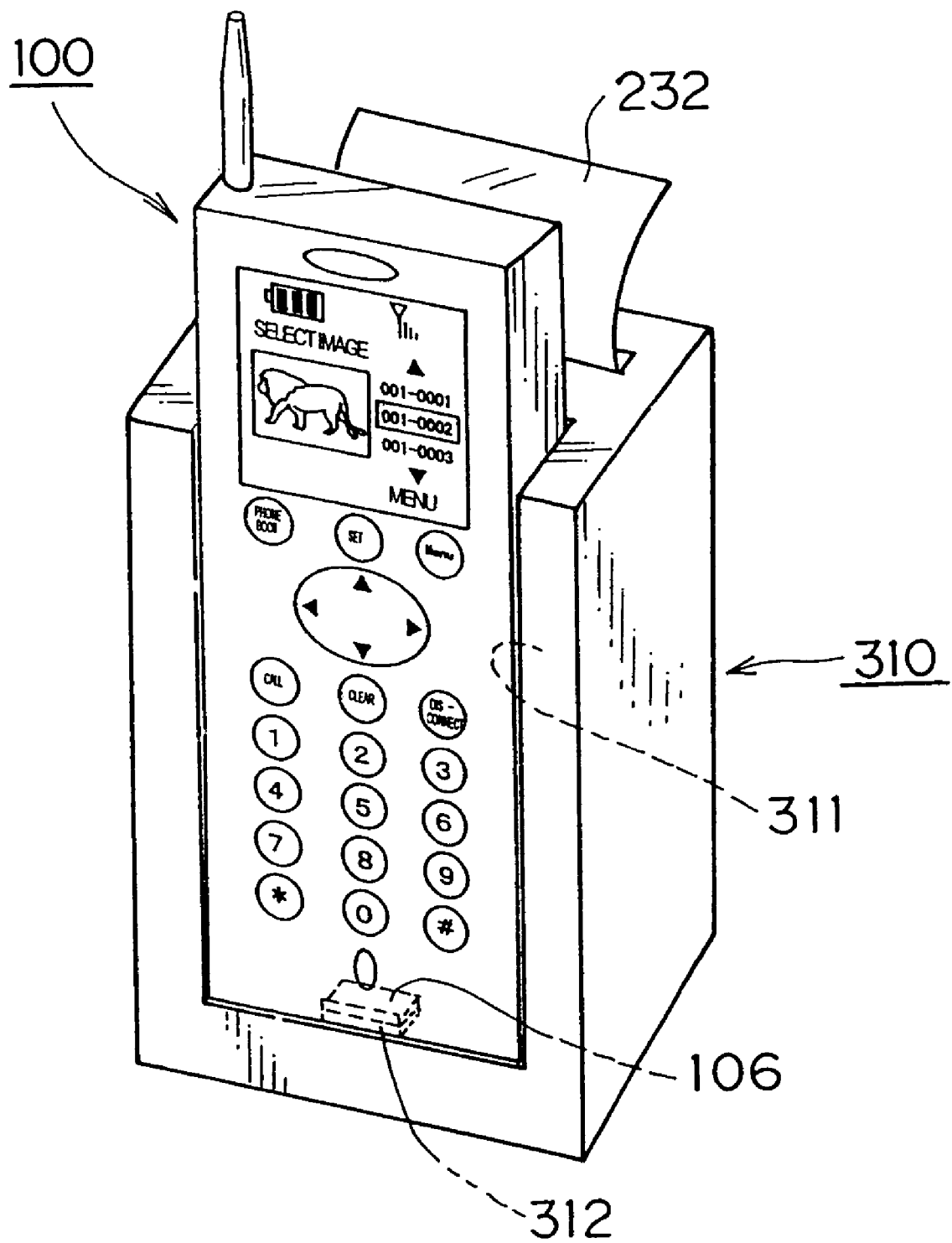
FIG. 5 is a perspective view showing a state in which the cellular phone is widthwise connected to a portable printer.
Figure 7:
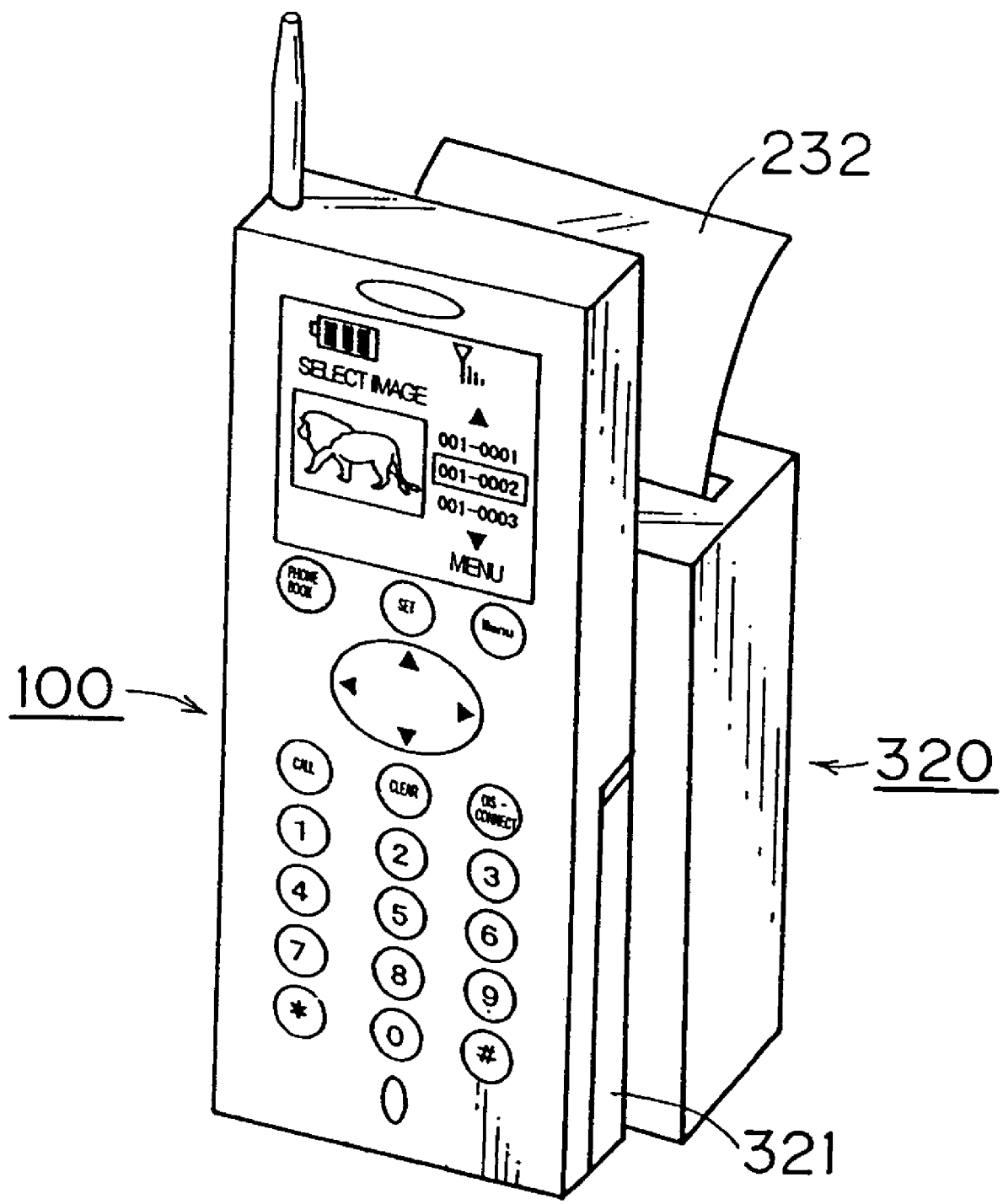
FIG. 7 is a perspective view showing a state in which the cellular phone is widthwise connected to the portable printer.

In FIGS. 5, 6 and 7, the cellular phone 100 is widthwise connected to a portable printer 310 and 320. In FIG. 5, the cellular phone 100 is inserted into a recess 311 of the portable printer 310, and the connector 106 provided on the bottom of the cellular phone 100 is directly connected to a connector 312 provided on the bottom of the recess 311.

In FIGS. 6 and 7, a battery 108 is detached from a battery attaching part 107 of the cellular phone 100, and a swell 321 (in the same shape as the battery 108) of the portable printer 320 is attached to the battery attaching part 107. The battery 108 is a battery pack that forms a part of the exterior of the cellular phone 100, and the swell 321 of the portable printer 320 has the same coupling part (not shown) as the battery 108 has, and the coupling part couples the cellular phone 100 and the portable printer 320.

A connector 109 is arranged in the battery attaching part 107, and the battery of the portable printer 320 is included in the swell 321, and a connector 322 is provided on the swell 321. The connector 322 is directly connected to the connector 109 of the cellular phone, and the power is supplied from the battery to the cellular phone.

When the cellular phone 100 and the portable printers are directly connected as shown in FIGS. 3-7, the user can hold both of them with one hand and operate the cellular phone 100 with the other hand. They may be mechanically connected in other ways.

When they are connected, the battery of the portable printer may be used as the main power source, and it may be used as the backup power source, and it may be used to charge the battery of the cellular phone. If the battery of the portable printer can be detached from the printer, it can be used when the battery of the cellular phone is dead.

Figure 8:
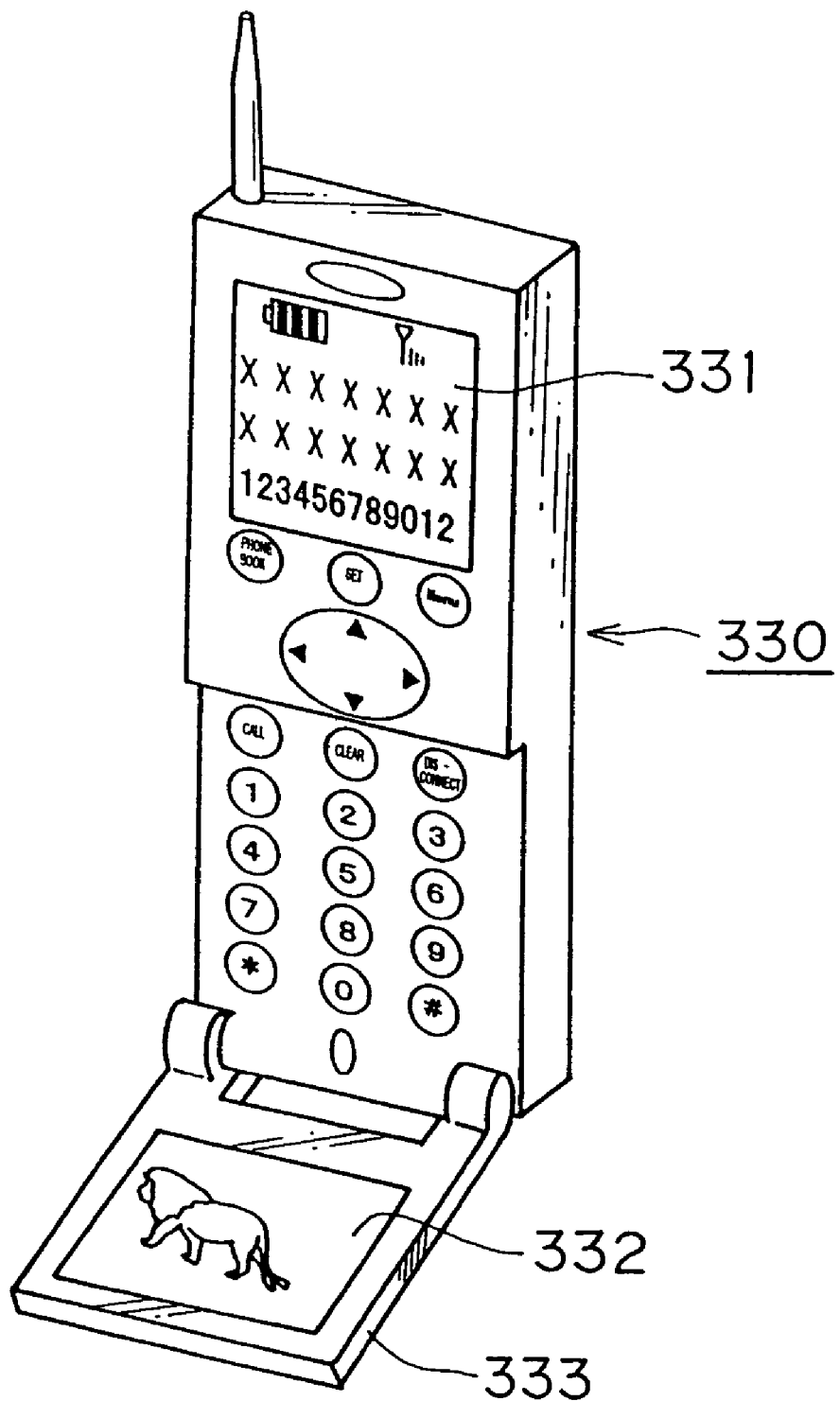
FIG. 8 is an appearance view of a cellular phone with two displaying parts.
Figure 9:
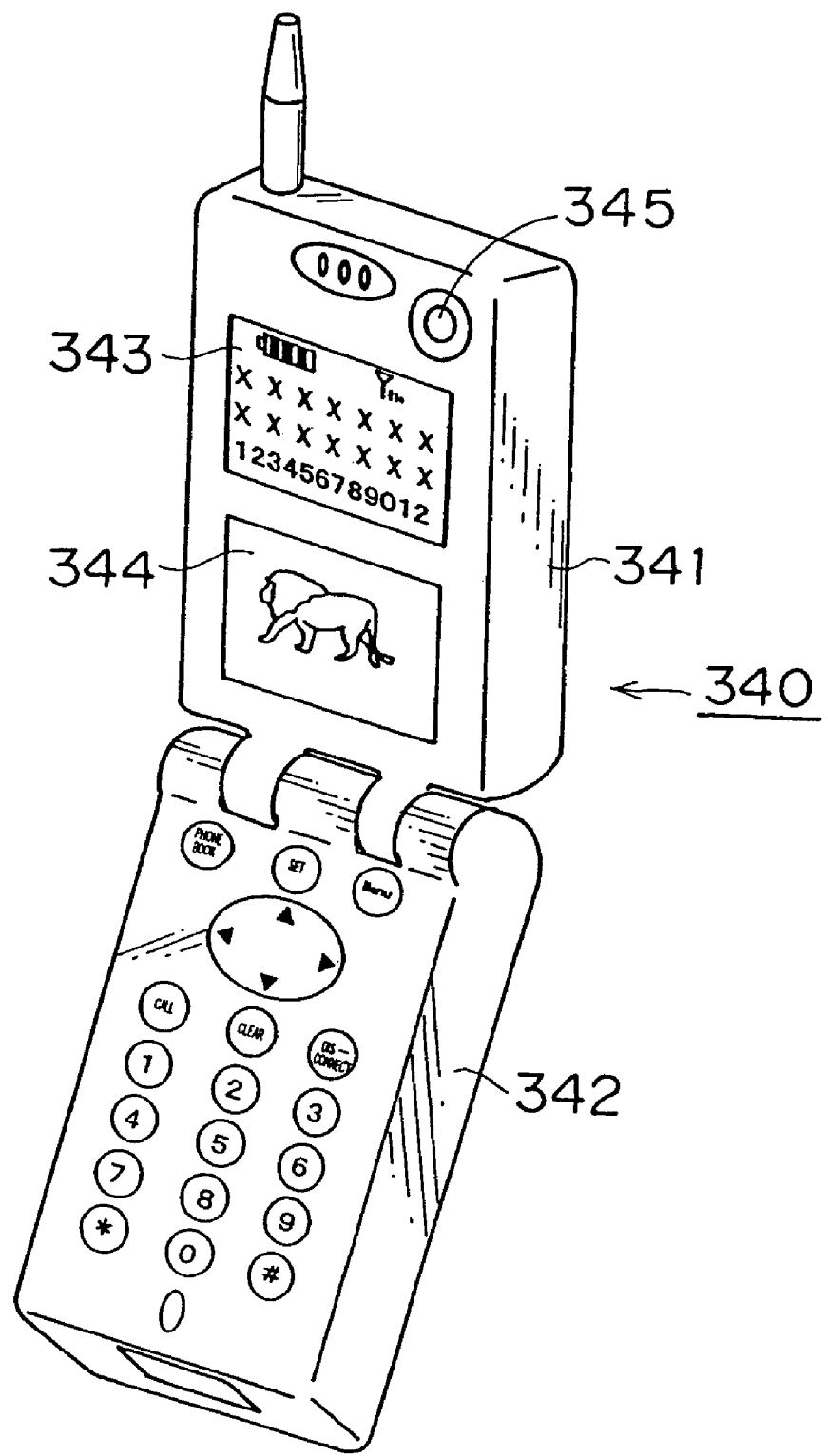
FIG. 9 is an appearance view of another cellular phone with two displaying parts.

FIGS. 8 and 9 are appearance views of cellular phones with two displaying parts. In FIG. 8, a first LCD 331 is provided on the body of a cellular phone 330, and a second LCD 332 is provided on the inner surface of a lid 333 for a part of a control part.

The first LCD 331 mainly displays communication information and characters, and it is, for example, a black-and-white liquid crystal display with a small number of pixels. The second LCD 332 mainly displays an image, and it is, for example, a color liquid crystal display with a large number of pixels.

The first LCD 331 and the second LCD 332 are separately controlled. When the image is not needed (for example, when the user is not using the phone and when the user is talking on the phone), only the first LCD 331 operates and the second LCD 332 is turned off to save electricity. When the characters and the image are both needed, they are easy to see since they are not displayed on one LCD. Also, the first LCD 331 is less expensive than the second LCD 332.

FIG. 9 shows a folding cellular phone 340 in which a displaying part 341 is jointed with a control part 342 through a hinge. The displaying part 341 has a first LCD 343 that mainly displays characters and a second LCD 344 that mainly displays an image. The displaying part 341 also has an imaging part 345. The imaging part 345 captures a moving image when the cellular phone 340 is used as a Video phone, and it captures a still image when the cellular phone 340 is used as an electronic camera.

Figure 10:
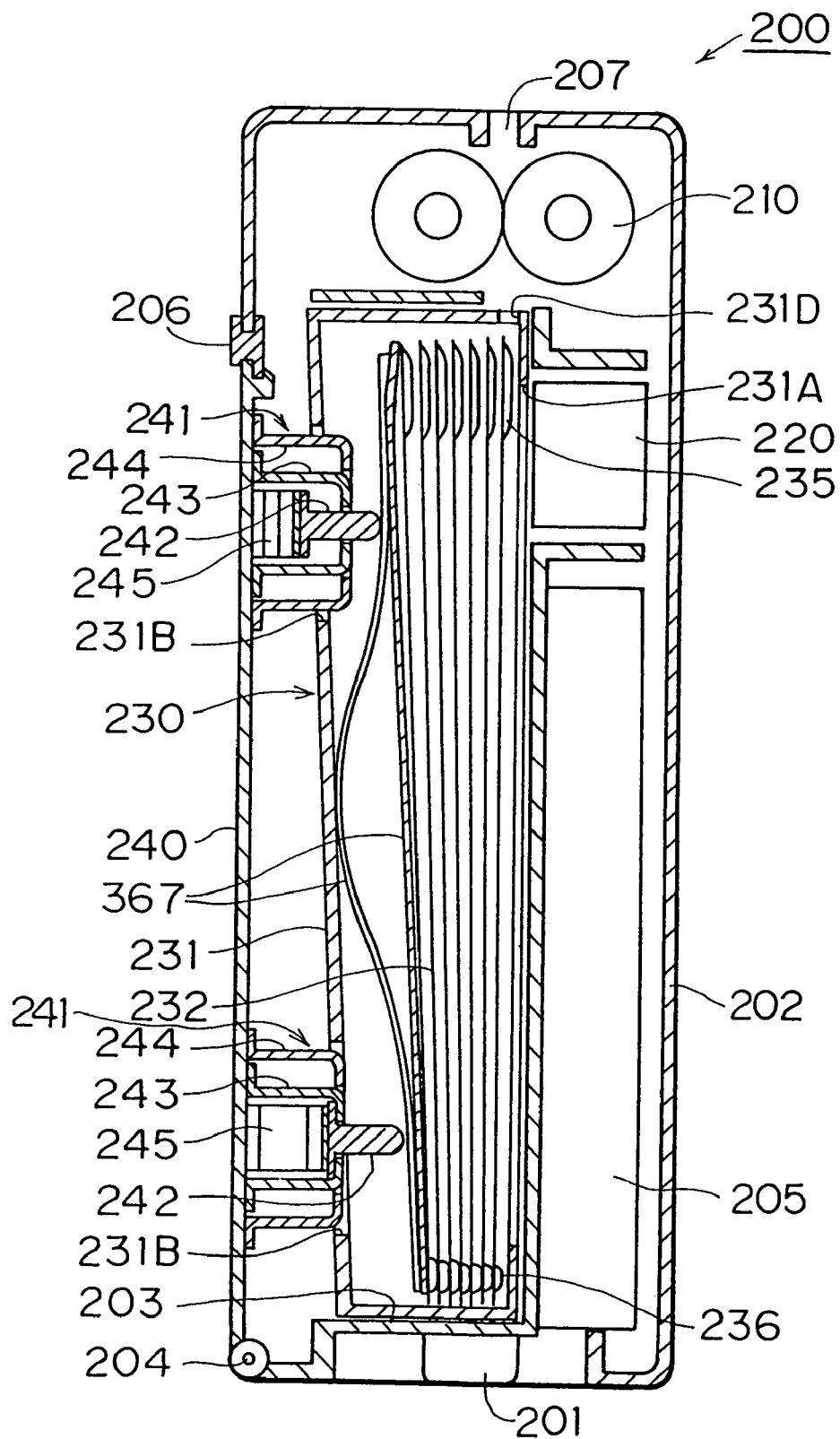
FIG. 10 is a section of the portable printer.

FIG. 10 is an enlarged section of the portable printer 200. Spread rollers 210, a light-emission head 220, a film pack compartment 203 that stores a film pack 230, and so on are provided in a casing 202 of the portable printer 200. A lid 240 is provided on the casing 202 through a hinge 204 at the bottom of the casing 202. The part denoted by the reference numeral 205 contains a battery chamber, a circuit board and so on. The reference numeral 207 shows an ejection slot for the instant print film 232.

The lid 240 is normally closed as shown in FIG. 10. When the film pack 230 is to be put in or taken from the a film pack compartment 203, a slide switch 206 is operated to open the lid 240.

The film pack 230 is composed of a plastic casing 231 and the instant print films 232 (for example, 10 sheet films) stored in the casing 231. Pressure parts 241 provided on the inner surface of the lid 240 push the instant print films 232 so that the film in the front is at an exposure opening 231A of the casing 231.

Figure 11:
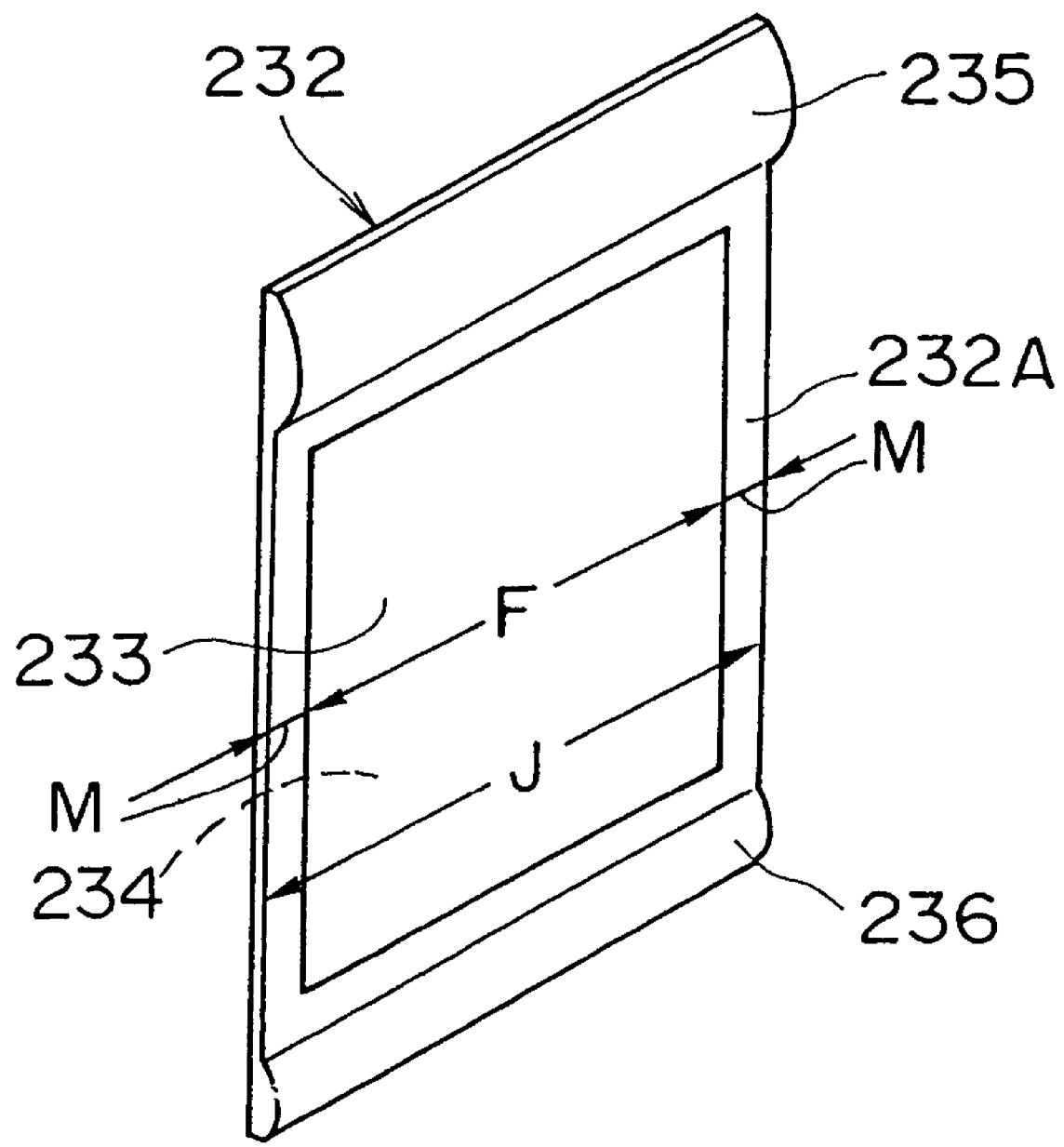
FIG. 11 is a perspective view of an instant print film used by the portable printer.

As shown in FIG. 11, each instant print film 232 is composed of a photosensitive sheet 233, an image receiving sheet 234 on the other side of the photosensitive sheet 233, a developer pod 235 that contains developer above the photosensitive sheet 233 and the image receiving sheet 234, and a trap 236 that absorbs the remainder of the developer below the photosensitive sheet 233 and the image receiving sheet 234. The photosensitive sheet 233 is exposed to photochemically form a latent image, and then the photosensitive sheet 233 and the image receiving sheet 234 are put together, and they are pressurized while the developer is spread between them to form a positive. The instant print film 232 is about half the size of a business card, and the positive formed on the instant print film 232 is a square of 3 to 4 centimeters on a side. The size of the instant print film 232 is not limited to that, and the positive does not need to be necessarily square. But, the smaller the size of the positive is, the more preferably it is for it be square.

As shown in FIG. 10, the pair of pressure parts 241 are provided on the inner surface of the lid 240 to project toward the film pack 230. The pressure parts 241 are provided so that they are inserted into the film pack 230 through openings 231B of it when the lid 240 is closed. The pressure parts 241 push the instant print films 232 from behind through shade covers 367. This pushes the film in the front against the periphery of the exposure opening 231A to keep the film flat.

Each pressure part 241 is composed of a projecting block 242, an extending frame 243, a holding frame 244 and a plate spring 245. The base (a flange) of the projecting block 242 is in the extending frame 243, and the projecting block 242 is pushed to the right by the plate spring 245. The base (a flange) of the extending frame 243 is in the holding frame 244.

The holding frame 244 is fixed to the lid 240, and a hole is formed in the right surface of the holding frame 244 to enable the extending frame 243 to extend from it. The flange of the extending frame 243 prevents it from coming out of the holding frame 244 by being in contact with the periphery of the hole. A hole is formed in the right surface of the extending frame 243 to enable the projecting block 242 to project from it. The flange of the projecting block 242 prevents it from coming out of the extending frame 243 by being in contact with the periphery of the hole.

The pressure part 241 increases the total movement amount of the projecting block 242, and it makes the holding frame 244 thin to make the portable printer 200 smaller in size.

Figure 14:
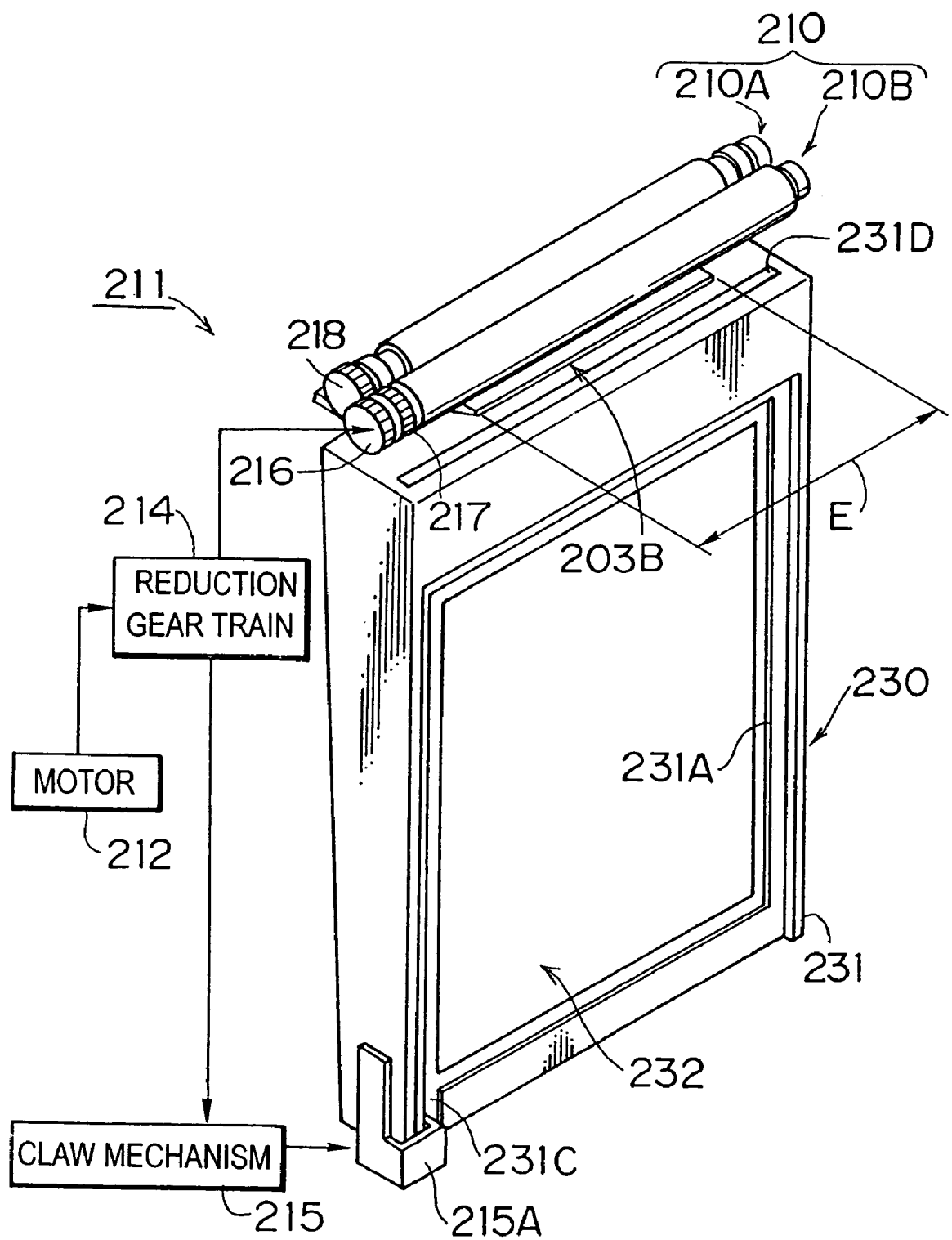
FIG. 14 is an explanatory view showing the structure of a spread mechanism of the portable printer.

As shown in FIGS. 12, 13 and 14, a film feeding part 211 for the instant print film 232 is mainly composed of the pair of spread rollers 210, a spread motor 212 and a driving mechanism 213. The driving mechanism 213 includes a reduction gear train 214 and a claw mechanism 215 shown in FIG. 14.

As shown in FIG. 14, a cutout 231C is formed below the exposure opening 231A of the casing 231, and a claw 215A is inserted into the cutout 231C. The claw 215A is driven by the claw mechanism 215 to move upward. The claw 215A comes in contact with the bottom of the foremost film 232, and then pushes it up to feed its top end out of the casing 231 from an exit 231D. The claw mechanism 215 converts the rotation of the reduction gear train 214 connected to the spread motor 212 into the vertical slide of the claw 215A.

The spread rollers 210 are a first spread roller 210A that comes in contact with the image receiving sheet 234 of the film 232 and a second spread roller 210B that comes in contact with the photosensitive sheet 233 of the film 232. A driving gear 216 engaged with the reduction gear train 214 is provided at one end of the second spread roller 210B, and driving force is transmitted from the spread motor 212 to the second spread roller 210B through the reduction gear train 214 and the driving gear 216. This rotates the second spread roller 210B clockwise in FIG. 14. A transmission gear 217 is provided near the driving gear 216 on the second spread roller 210B, and engaged with a driven gear 218 provided at one end of the first spread roller 210A. This rotates the first spread roller 210A counterclockwise.

The first spread roller 210A is pushed against the second spread roller 210B by a spring. This makes it possible for the spread rollers 210 to appropriately press the film 232 and evenly spread the developer.

The light-emission head 220 will now be explained.

As shown in FIG. 13, the light-emission head 220 is fixed at the top of the exposure opening 231A of the film pack 230, and a main scanning direction M of the light-emission head 220 is perpendicular to the feeding direction of the film 232 (a subscanning direction S).

FIG. 15 is a section of the light-emission head 220. The light-emission head 220 has an organic light-emitting-device array unit 222 and a microlens array (a SELFOC lens group, a microlens group, or the like) 223.

The organic light-emitting-device array unit 222 is composed of organic light-emitting-device arrays 222R, 222G and 222B. The peak wavelength of the emission spectrum of the organic light-emitting-device array 222R is 600-740 nm (red), and the peak wavelength of the emission spectrum of the organic light-emitting-device array 222G is 500-600 nm (green), and the peak wavelength of the emission spectrum of the organic light-emitting-device array 222B is 380-500 nm (blue). Each of the organic light-emitting-device arrays 222R, 222G and 222B has multiple light-emitting devices corresponding to the horizontal pixels of the film 232 (the main scanning direction), and they are vertically arranged along the feeding direction of the film 232 (the subscanning direction). The brightness and time of the light emission by each light-emitting device are controlled according to the corresponding pixel.

The microlens array 223 prevents the lights from spreading to other pixels, and it is composed of SELFOC lenses 223R, 223G and 223B. The top and bottom SELFOC lenses 223R and 223B are inclined with respect to the middle SELFOC lens 223G so that the lights focus on one line of the pixels of the film 232.

In case directivity of the lights is high, the microlens array 223 may be omitted. In addition, band-pass filters may be provided between the organic light-emitting-device array unit 222 and the microlens array 223. The band-pass filters decreases the full width at half maximum of the emission spectrums, and reduces spectral color-mixing at the exposure to raise color reproduction.

The light-emission head 220 exposes the film 232 on the line-by-line basis with the main scanning while the film 232 is fed (subscanning). The spread rollers 210 appropriately press the film 232 to evenly spread the developer, and feed the film 232 out of the printer 200 through the ejection slot 207.

FIG. 16 shows another light-emission head 224 that may be applied to the printer 200.

The light-emission head 224 is mainly composed of light-emitting diodes 225R, 225G and 225B, a light guide 226, a reflector 227, a liquid crystal shutter 228 and a microlens array 229.

The light-emitting diodes 225R, 225G and 225B emit lights in turn when one line of the pixels of the film is exposed. The R, G and B lights emitted from the light-emitting diodes 225R, 225G and 225B are guided to the light guide 226 extending along the main scanning direction, and then reflected to the liquid crystal shutter 228 by the reflector 227.

The liquid crystal shutter 228 has liquid crystal segments corresponding to the pixels, and transmittance of each liquid crystal segment is controlled three times according to the R, G and B image data for one line. The transmitted lights that have passed the liquid crystal shutter 228 are guided to the film through the microlens array 229 to form an image on the film.

In the portable printer 200 of the embodiment, the light-emission head is fixed, and the film is exposed on the line-by-line basis while being fed. But, the light-emission head may be moved along the subscanning direction to expose the film on the color-by-color basis.

FIG. 17 shows a printing part 250 that exposes the film on the color-by-color basis. The printing part 250 comprises the spread rollers 210, a head driving mechanism 251 and a scan head 252. The main scanning direction M of the scan head 252 is perpendicular to the feeding direction of the film 232 (the subscanning direction S), and the length of the scan head 252 is larger than the width of the film 232. The head driving mechanism 251 moves the scan head 252 along the subscanning direction S with a scan motor 251A. Guide pins are provided on both sides of the scan head 252 and coupled with guide grooves so that the scan head 252 does not become oblique.

Figure 18:
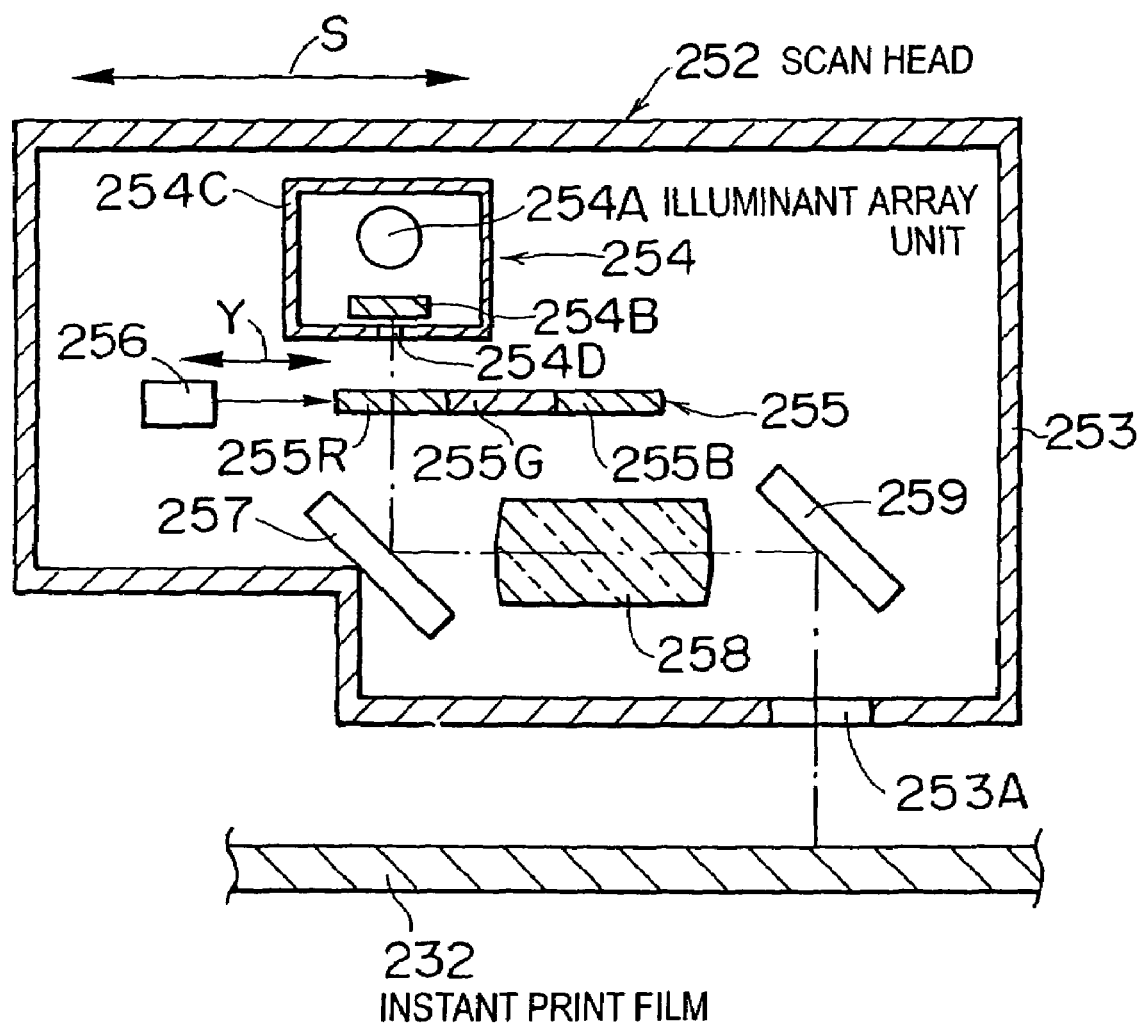
FIG. 18 is a section of the scan head.

FIG. 18 is a section of the scan head 252. The scan head 252 has an illuminant array unit 254 perpendicularly to the subscanning direction S, and the illuminant array unit 254 is composed of a fluorescent lamp 254A, a liquid crystal shutter 254B and a shade casing 254C.

The liquid crystal shutter 254B is at the inside of an opening 254D of the shade casing 254C, and it has a line of liquid crystal segments. Each liquid crystal segment corresponds to one pixel of the film 232, and depth and the amount of a transmitted light of each liquid crystal segment are controlled.

Color filters 255 are provided outside the illuminant array unit 254, and they are filters 255R, 255G and 255B for R, G and B exposures, respectively. A filter shifting part 256 moves the color filters 255 along an arrow Y so that one of the filters 255R, 255G and 255B is on the optical path.

R, G or B print lights that have passed the filter 255R, 255G or 255B are guided to a mirror 257, a SELFOC lens array 258 and a mirror 259, and they come out of the scan head 252 through an opening 253A to arrive at the film 232.

To efficiently expose the film, the R exposure is performed while the scan head 252 goes down, and the G exposure is performed while the scan head 252 returns. Then, after the scan head 252 is stopped, the B exposure is performed while the film 232 is fed. This shortens the exposure time.

The spread mechanism for the film 232 will now be explained with reference to FIGS. 19 and 20.

As shown in FIG. 19, a slit 203A is formed in the top of the film pack compartment 203, and the exposed film 232 is sent out of the film pack compartment 203 through the slit 203A. The slit 203A is on the right (in FIG. 19) of the exit 231D of the film pack 230. A spread controller 203B is formed on one side of the slit 203A, and it comes in contact with the image-receiving sheet 234 of the film 232 to control the spread of the developer 237 that flows from the developer pod 235 to between the photosensitive sheet 233 and the image-receiving sheet 234.

The tip of the spread controller 203B is round so as not to damage the image-receiving sheet 234. The bottom of the spread controller 203B is tapered to guide the film 232 from the exit 23 ID of the film pack 230 to the slit 203A.

The width E of the spread controller 203B (see FIG. 14) is smaller than the width F of the image-forming surfaces of the photosensitive sheet 233 and the image-receiving sheet 234 (see FIG. 11), and thus the spread controller 203B can spread the developer without coming in contact with a frame sheet 232A.

The first spread roller 210A is pushed against the second spread roller 210B by the spring 238. Thus, the spread rollers 210 can appropriately press the film 232 and evenly spread the developer.

The second spread roller 210B does not move to stabilize the effect of the spread controller 203B. The contact state (contact position, pressure and so on) between the film 232 and the spread controller 203B and the bend state of the film 232 between the exit 231D and the spread rollers 210 are kept constant.

Figure 20:
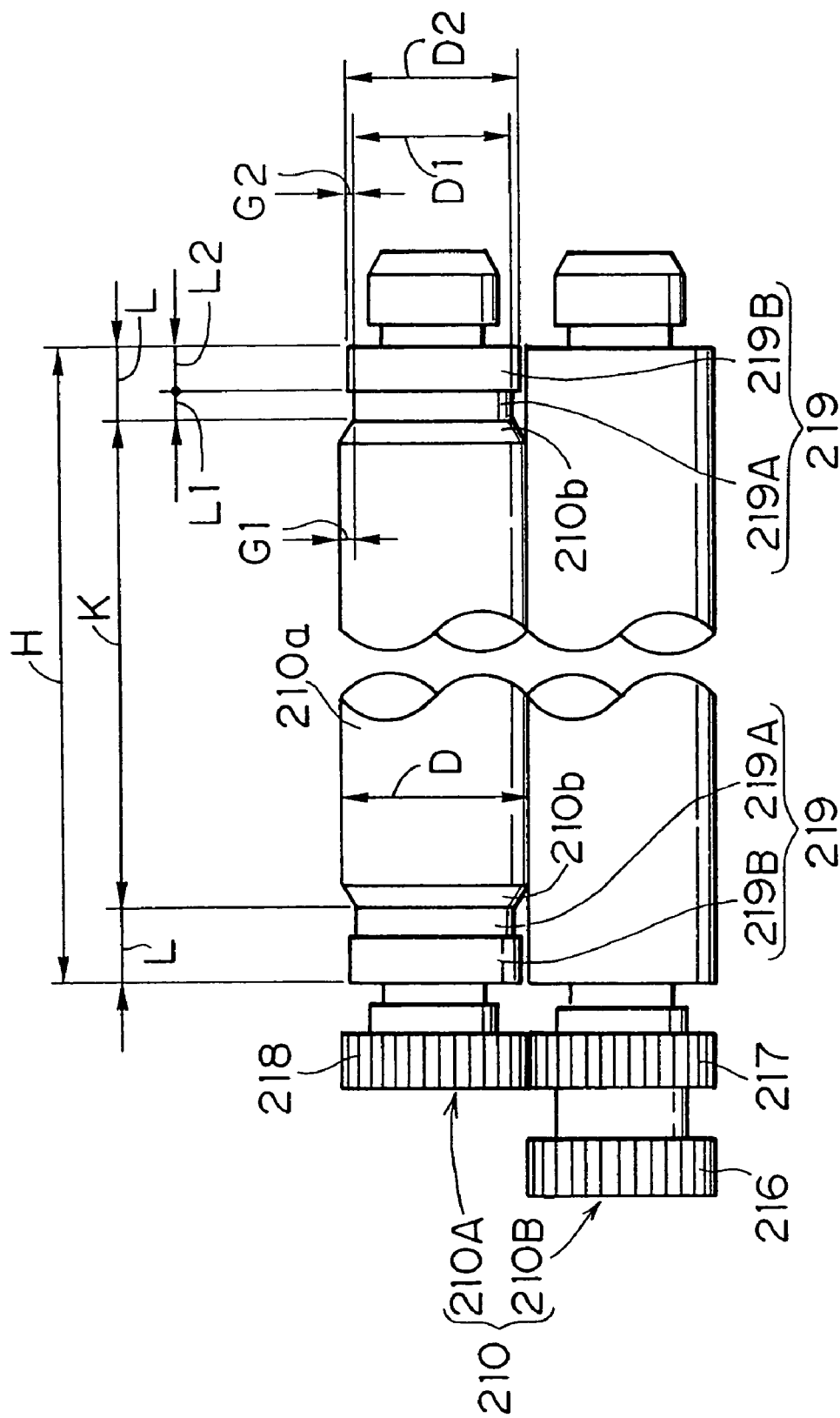
FIG. 20 is a plan of spread rollers of the portable printer.

As shown in FIG. 20, the first spread roller 210A is composed of a spread part 210a formed in the middle of the first spread roller 210A to press the image-forming surface of the film 232 and thin parts 219 formed at both ends of the spread part 210a. The thin parts 219 are thinner than the spread part 210a, and each thin part 219 is composed of a first thin part 219A on the middle side and a second thin part 219B on the end side.

A diameter D of the spread part 210a is larger than a diameter D1 of the first thin part 219A, and the diameter D2 of the second thin part 219B. Half of the difference G1 between the diameters D and D1 is equal to the thickness of the frame sheet 232A of the film 232, and half of the difference G2 between the diameters D2 and D1 is equal to the appropriate thickness of the spread developer.

A length H of the first spread roller 210A and the second spread roller 210B is substantially equal to a width J of the film 232 (see FIG. 11), and the width K of the spread part 210a is slightly smaller than the width F of the image-forming surfaces of the photosensitive sheet 233 and the image-receiving sheet 234. A total length L of the length L1 of the first thin part 219A and the length L2 of the second thin part 219B is equal to a width M of the frame sheet 232A. Inclined parts 210b are formed between the spread part 210a and the first thin parts 219A.

The sides of the frame (the frame sheet 232A) of the film 232 are pinched by the second thin part 219B and the second spread roller 210B. This makes the gap between the spread part 210a of the first spread roller 210A and the second spread roller 210B appropriate for the spread of the developer when the film 232 is pinched. In addition, the spread part 210a comes in contact with the image-forming surface without coming into contact with the frame sheet 232A, and this improves the spread effect of the developer.

Also, gaps of the thickness of the frame sheet 232A are formed between the first thin parts 219A and the second spread roller 210B when the film 232 is pinched since the first thin parts 219A is thinner than the second thin parts 219B. The developer flows into the gaps to firmly come to the edges of the image-forming surface, and this keeps the quality of the entire print appropriate.

In addition, since the inclined parts 210b are formed between the spread part 210a and the first thin parts 219A, the image-receiving sheet 234 and an image-receiving layer of the film 232 are smoothly bent. This prevents splits and the like of the image-receiving sheet 234 due to stress concentration, and spreads the developer to the edges of the image-forming surface.

The tip of the spread controller 203B is substantially right below the contact position of the spread rollers 210A and 210B. The film 232 comes in contact with the spread rollers 210, the spread controller 203B and the side of the exit 231D, and the film 232 is gently bent in the S-shape. Because of the bend of the film 232 and the stabilization of the contact of the film 232 and the spread controller 203B, the thickness of the spread developer becomes even and constant.

Figure 21:
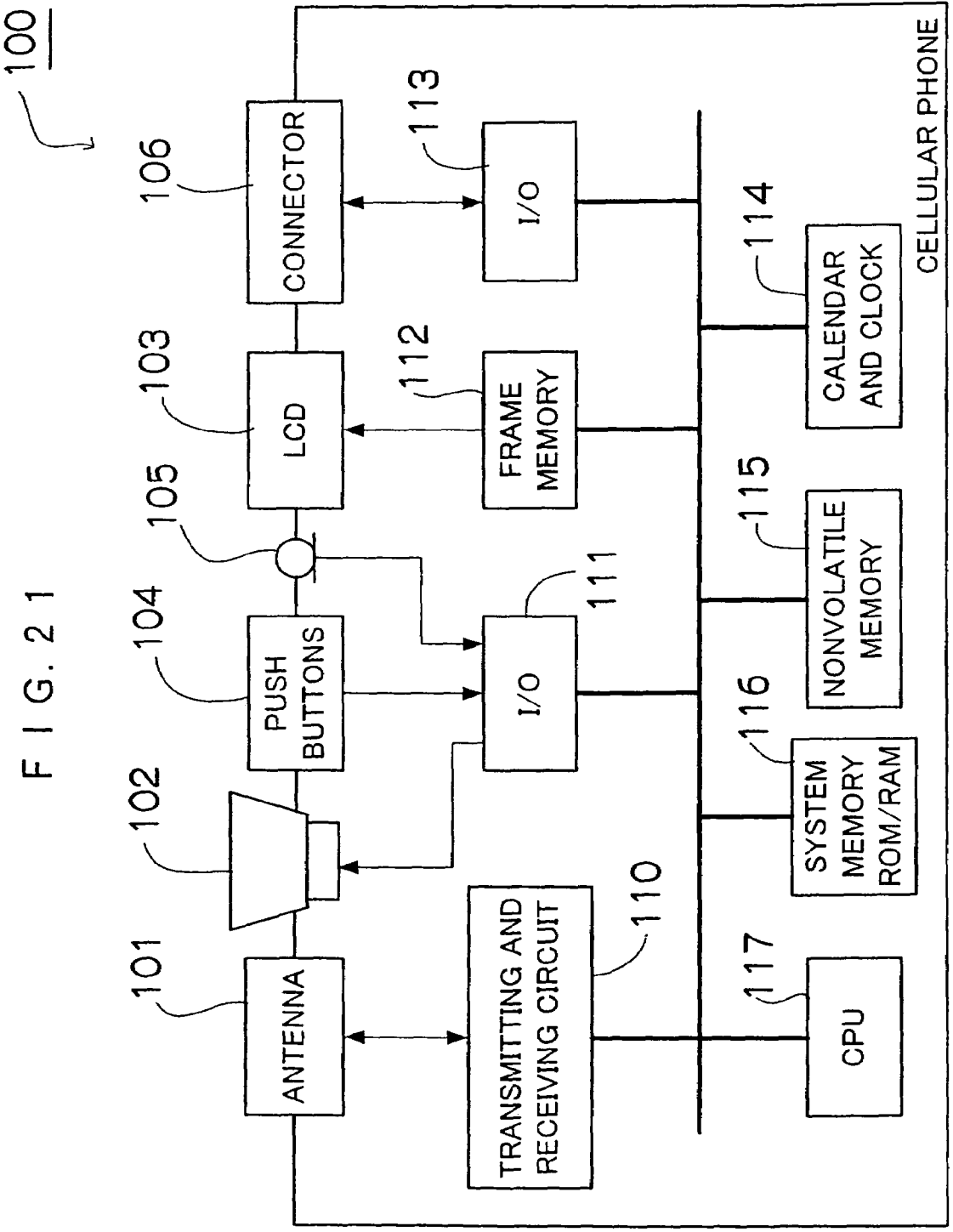
FIG. 21 is a block diagram showing the inner structure of the cellular phone.

FIG. 21 is a block diagram showing the structure of the cellular phone 100. The cellular phone 100 comprises a transmitting and receiving circuit 110 connected to the antenna 101, the receiver 102, an I/O port 111 connected to the push buttons 104 and the transmitter 105, a frame memory 112 that stores the image data for displaying the characters or the image on the LCD 103, the push buttons 104 for designating the telephone number, the characters and the image, an I/O port 113 connected to the connector 106 for data communication, a calendar/clock part 114, a nonvolatile memory 115 such as a flash memory and an EEPROM, a system memory 116 and a central processing unit (CPU) 117 that controls the whole circuit of the cellular phone 100.

The nonvolatile memory 115 stores character data such as telephone numbers, memos and mails and image data such as received image data. The system memory 116 is composed of a ROM storing programs for operating the cellular phone and a RAM that temporarily stores data at calculations, image processings and so on.

The CPU 117 executes the programs stored in the system memory 116 according to the operation of the push buttons 104. The CPU 117 transmits and receives sound, characters and an image through the antenna 101 and the transmitting and receiving circuit 110, and stores the image data in the frame memory 112 to display the communication information, the image and the characters on the LCD 103. The CPU 117 also communicates with the apparatus connected to the connector 106 through the connector 106 and the I/O port 113.

Operations that are specific to the cellular phone 100 will be explained later.

Figure 22:
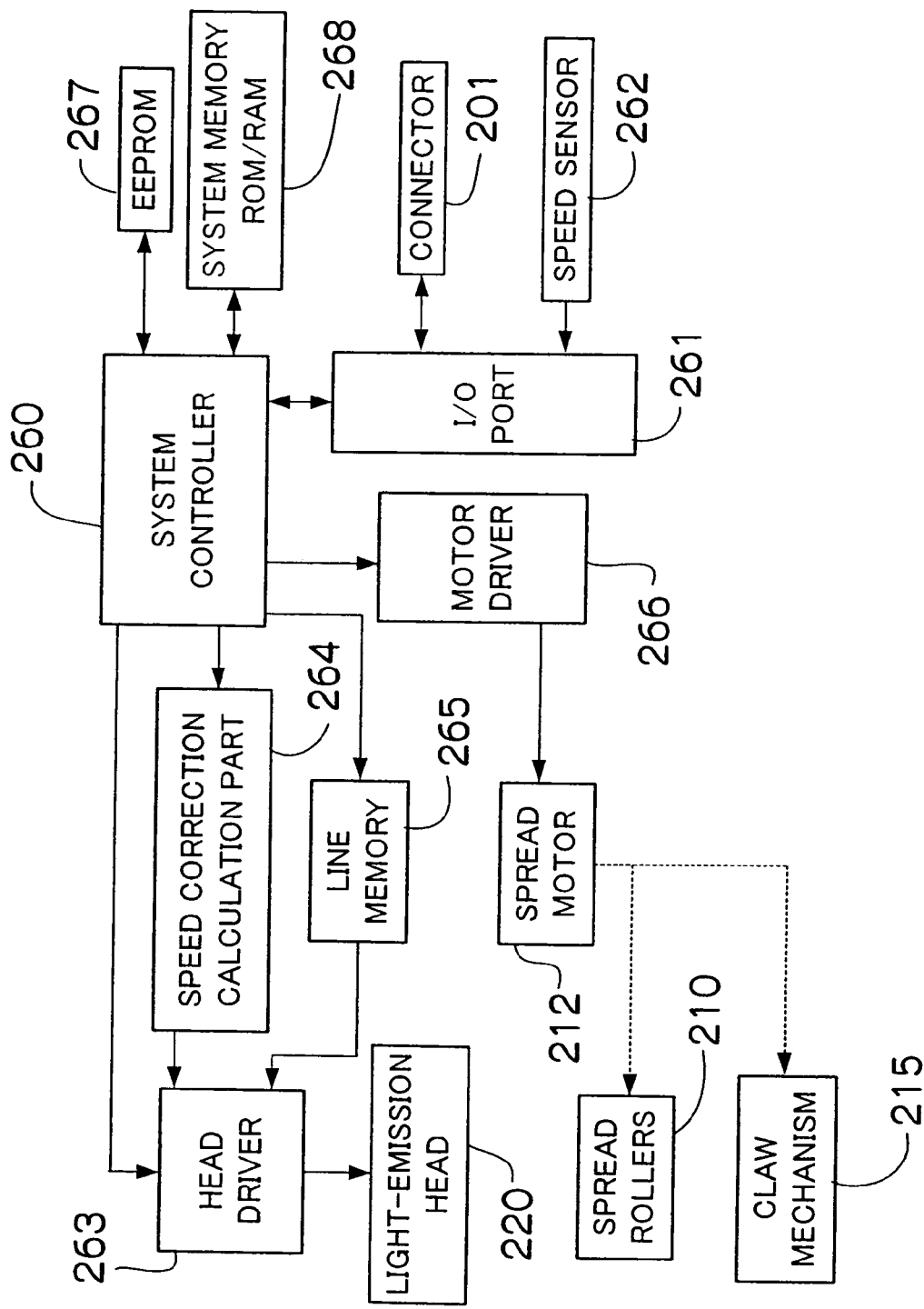
FIG. 22 is a block diagram showing the inner structure of the portable printer.

FIG. 22 is a block diagram showing the structure of the portable printer 200. A system controller 260 controls a head driver 263, a speed correction calculation part 264, a line memory 265, a motor driver 266 and so on according to commands and image data inputted from the connector 201 through and I/O port 261, speed data of the film inputted from a speed sensor 262 through the I/O port 261, and so on.

An EEPROM 267 stores data on the remaining frames of the film, aspect ratios and the number of pixels, adjustment data referred to by the system controller 260, and so on. The system memory 268 is composed of a ROM storing programs for operating the printer and a RAM that temporarily stores calculation data, image data and so on.

The head driver 263 drives the organic light-emitting-device arrays 222R, 222G and 222B of the light-emission head 220 in accordance with commands from the system controller 260. The R, G and B image data for one line is inputted from the line memory 265 to the organic light-emitting-device arrays 222R, 222G and 222B to control the light emission times of the light-emitting devices. The motor driver 266 drives the spread motor 212 under the control of the system controller 260.

The light-emission head 220 and the spread rollers 210 are synchronously controlled by the system controller 260 through the head driver 263, the motor driver 266 and so on. The speed sensor 262 and the speed correction calculation part 264 prevents depth unevenness due to changes of the feed amount of the film 232.

The speed sensor 262 is composed of a roller in contact with the film 232, a pulse encoder provided on the roller, and a signal processing circuit. The signal processing circuit determines intervals of pulses outputted from the pulse encoder with reference clocks to determine the feed speed of the film 232. A speed signal indicating the feed speed is outputted to the system controller 260 through the I/O port 261.

The speed correction calculation part 264 produces data for controlling light-emission timing according to the feed speed of the film 232, and sends it to the head driver 263 so that the desired depth can be achieved regardless of the changes of the speed of the film 232.

The operation of the cellular phone 100 at the printing will now be explained with reference to a flowchart in FIG. 23.

First, the user pushes a menu button of the cellular phone 100 to choose to print an image. Suppose the nonvolatile memory 115 of the cellular phone 100 stores the image data and the character data. The portable printer 200 is connected to the cellular phone 100 before the print menu is chosen or just before the printing.

After the print menu is chosen, the LCD 103 of the cellular phone 100 displays an image-selection screen as shown in FIG. 2, and the user selects the image on the screen (step 10). The LCD 103 shows file numbers, a thumbnail corresponding to the enclosed file number, and so on, and the user displays thumbnails on the LCD 103 with up/down keys of a cross key. After finding the desired image, the user pushes a set key to decide to print the image. Then, an enlarged image of the thumbnail is displayed on the entire LCD 103. In case the cellular phone 100 has image data for only one image, the above-described image selection is not performed.

Next, it is determined whether or not there is a command for setting the number of prints (step 12), and it is determined whether or not there is a command for setting zooming (step 14), and it is determined whether or not there is a command for setting trimming (step 16), and it is determined whether or not there is a command for adjusting brightness (step 18), and it is determined whether or not there is a command for adjusting chromaticity (step 20).

At this time, as shown in FIG. 2, the "1" key, the "2" key, the "3" key, the "4" key and the "5" key of ten keys are used to set the number of prints, the zooming, the trimming, the brightness and the chromaticity, respectively. The "6" key is used to start the printing.

If the user pushes the "1" key (yes at step 12), a screen for setting the number of prints is displayed on the LCD 103 (FIG. 24(A)). "1" is displayed as the initial number, and the user sets the desired number of prints with the up/down keys of the cross key (step 22).

If the user pushes the "2" key (yes at step 14), a screen for setting the zooming of the image is displayed on the LCD 103 (FIG. 24(B)). A frame 270 with the same aspect ratio as that of the image is displayed. The data on the aspect ratio of the image is stored in the nonvolatile memory 115 of the cellular phone 100 or received from the portable printer 200. The area of the image displayed on the LCD 103 is shown by oblique lines.

The largest frame 270 is displayed as the initial frame, and the user changes the size of the frame 270 with the up/down keys of the cross key to set the zooming (step 24). The area within the frame 270 will be printed as the image.

If the user pushes the "3" key (yes at step 16), a screen for setting the trimming of the image is displayed on the LCD 103 (FIG. 24(C)). A frame 270 is displayed as the initial frame in the center ① of the image to show the print area (its size depends on the zooming), and the user moves it, for example, to the upper right ② with the up/down keys and left/right keys of the cross key to set the trimming (step 26). The frame 270 is not necessarily displayed, but the depth of the print area may be different from that of the other area, and only the print area may be colored.

If the user pushes the "4" key (yes at step 18), a screen for adjusting the brightness of the image is displayed on the LCD 103 (FIG. 24(D)). The user moves a cursor 271 with the left/right keys of the cross key to set the brightness (step 28).

If the user pushes the "5" key (yes at step 20), a screen for adjusting the chromaticity of the image is displayed on the LCD 103 (FIG. 24(E)). The user chooses to adjust hue or depth with the up/down keys of the cross key. The screen in FIG. 24(E) shows that the user has chosen to adjust the hue. The user moves a cursor 272 or 273 with the left/right keys of the cross key to set the chromaticity (step 30).

The above settings are performed as need arises.

After that, it is determined whether or not there is a command for printing (step 32). If the user pushes the "6" key, the image data of the selected image is outputted to the portable printer 200 (step 34). If anything was set, commands indicating the settings are outputted with the image data. The commands indicating the zooming and the trimming are not necessarily outputted. In this case, image data for only the print area of the image is abstracted, the image is resized, and the image data for the resized image is outputted. The printer does not have to trim the image, and only the needed data is outputted to shorten the communication time. Likewise, the commands indicating the brightness and the chromaticity are not necessarily outputted. In this case, image data of the corrected image is outputted.

As shown in FIGS. 24(B) and 24(C), though the aspect ratio of the image (the area shown by the oblique lines) displayed on the LCD 103 of the cellular phone 100 is different from that of the image to be printed (the frames 270), the desired print can be produced since the print area is shown and the image can be trimmed.

The LCD 103 may display the image with the same aspect ratio as that of the image to be printed according to the data received from the printer 200.

Then, the cellular phone 100 sends the printer 200 not the image data (stored in the frame memory 112) for the display of the LCD 103 but the image data with the highest resolution stored in the nonvolatile memory 115. In case the resolution of the image data is higher than that of the image to be printed, the image data is resized to the resolution of the image to be printed before the image data is outputted. In this case, only the needed data is transmitted, and the printer 200 does not have to resize the image data. The resolution of the image to be printed is received from the printer 200.

In the embodiment, the printer 200 does not have any buttons and displays to make it simple and inexpensive. But, it may have push buttons and a simple display for showing the remaining frames of the film.

Figure 25:
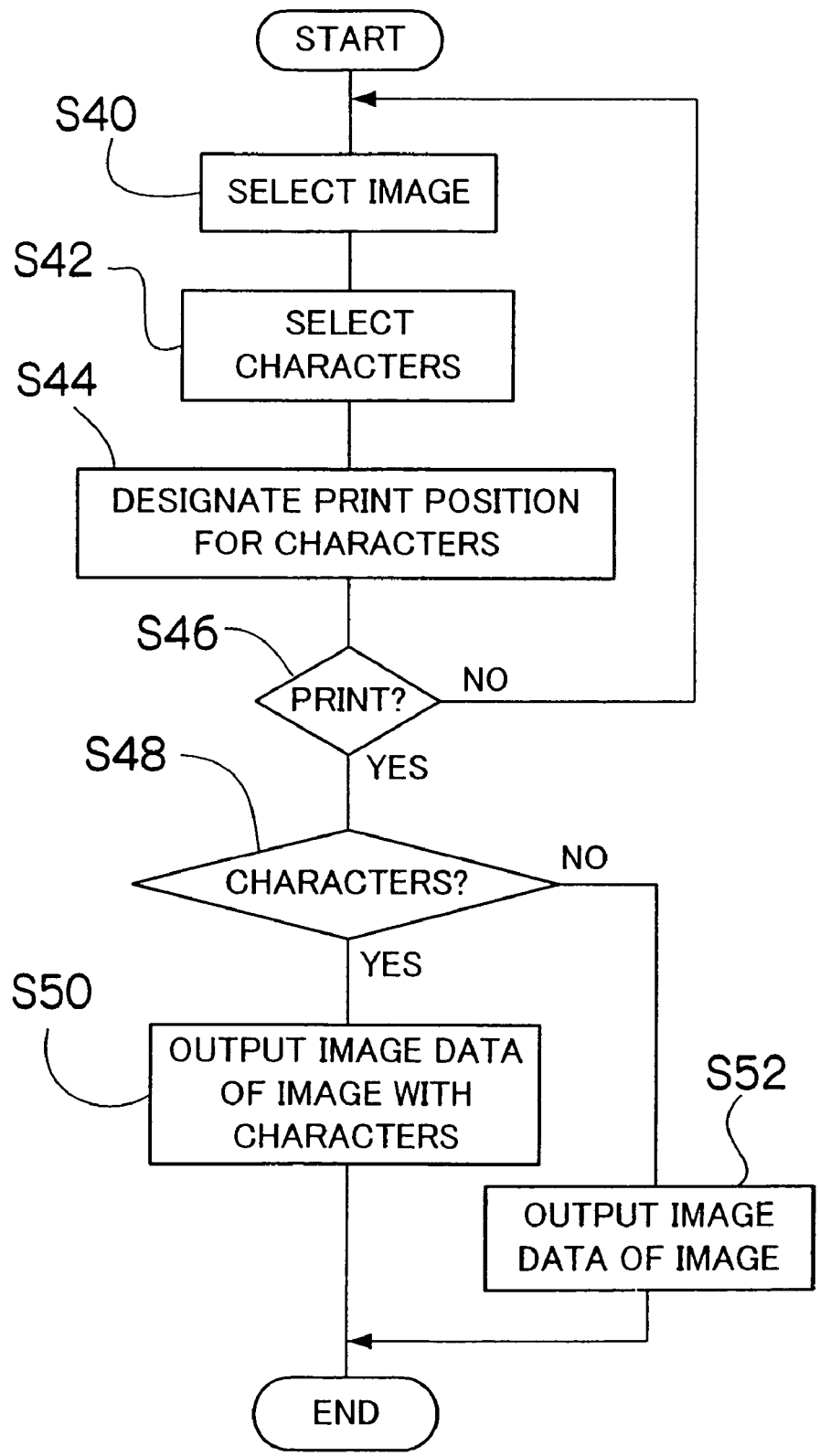
FIG. 25 is a flowchart showing the operation of the cellular phone at the printing.

The operation of the cellular phone 100 when the image and characters are printed will now be explained with reference to a flowchart in FIG. 25.

Figure 23:
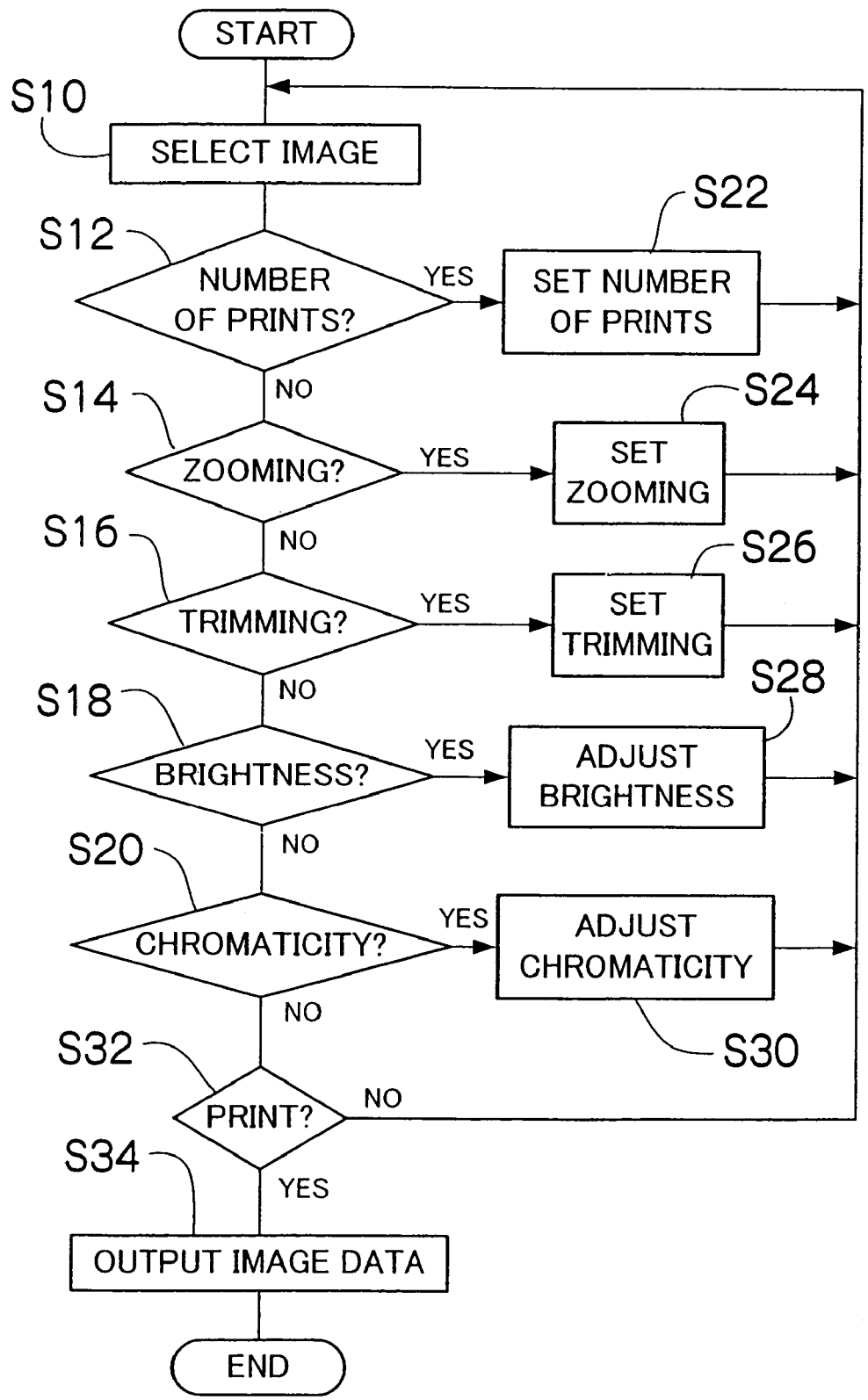
FIG. 23 is a flowchart showing the operation of the cellular phone at the printing.

First, the user pushes the menu button of the cellular phone 100 to choose to print the image, and selects the image in the same way as that at step 10 in FIG. 23 (step 40).

If the selected image is an attachment to a received e-mail, the image and the characters of the mail are displayed on the LCD 103 of the cellular phone 100.

Figure 26A:
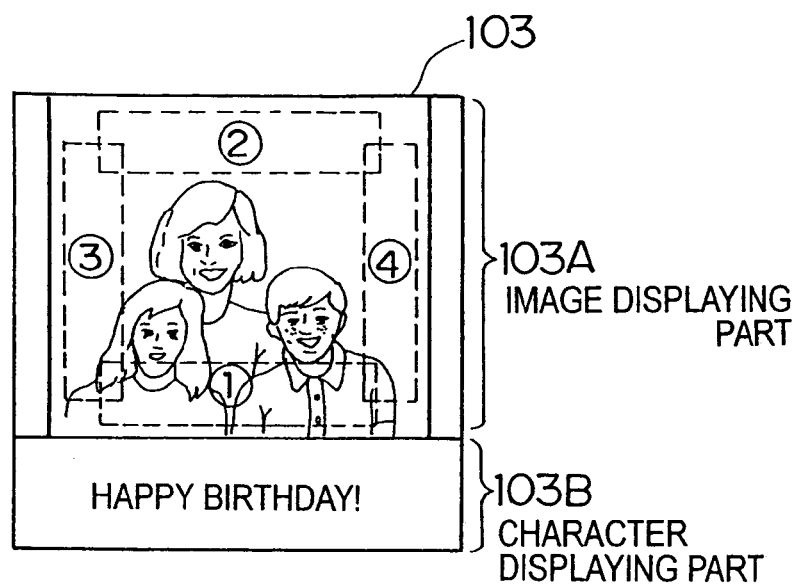
FIGS. 26(A) and 26(B) are diagrams showing a screen displayed on the LCD of the cellular phone at the printing and a print on the instant print film, respectively.

FIG. 26(A) shows the LCD 103 displaying the image and the characters. The screen is divided into an image display part 103A displaying the image and a character display part 103B displaying the characters.

Then, the desired characters to be printed are selected (step 42). The characters are scrolled on the character display part 103B to find the desired characters, and they are designated.

Next, the position where the characters are to be printed is designated on the image display part 103A (step 44). The user selects one of the bottom ①, the top ②, the left side ③ and the right side ④ of the image with the cross key.

Figure 26B:
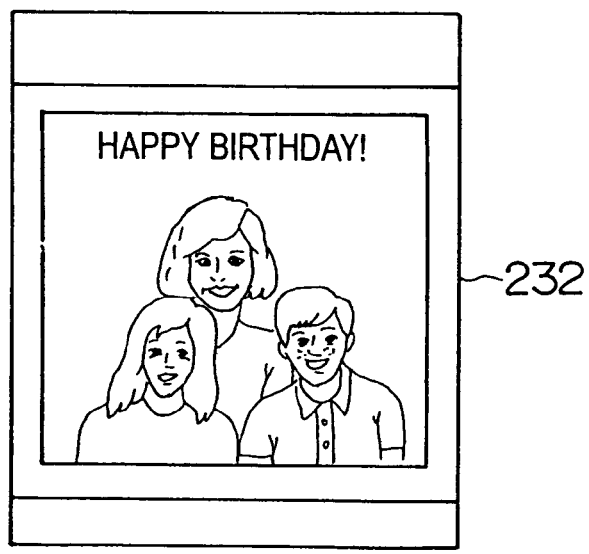

After that, it is determined whether or not there is the command for printing the image (step 46). If yes, it is determined whether or not the characters have been selected to be printed (step 48). If yes, the cellular phone 100 produces image data of the image on which the characters are superimposed, and outputs the produced data to the printer 200 (step 50). The printer 200 prints the image with the characters on the film 232 as shown in FIG. 26(B) according to the data.

If no at step 48, the image data of only the image is outputted (step 52).

The cellular phone 100 produces image data in the embodiment. But, the cellular phone 100 may output the image data, the character data and the data on the print position of the characters to the printer 200, which produces the image data of the image with the characters.

In addition, only the character data may be outputted to print only the characters. Also, the image and the characters are not necessarily displayed on the LCD 103, and they may be displayed separately as shown in FIGS. 8 and 9. Moreover, they are not necessarily received from other apparatuses, and they may be produced by a camera function and a character input function of the cellular phone. Furthermore, if a memory card can be detached from the cellular phone, the image data and the character data may be stored in the memory card to be obtained by the cellular phone.

Since the portable printer is an optical printer using the instant print film as the print medium, it does not need heat energy like a thermal printer. Thus, the printer can work on two batteries or so to save electricity, and therefore it is suited to be carried.

A portable printer that optically prints a screen displayed on an LCD of a cellular phone will now be explained.

Figure 27:
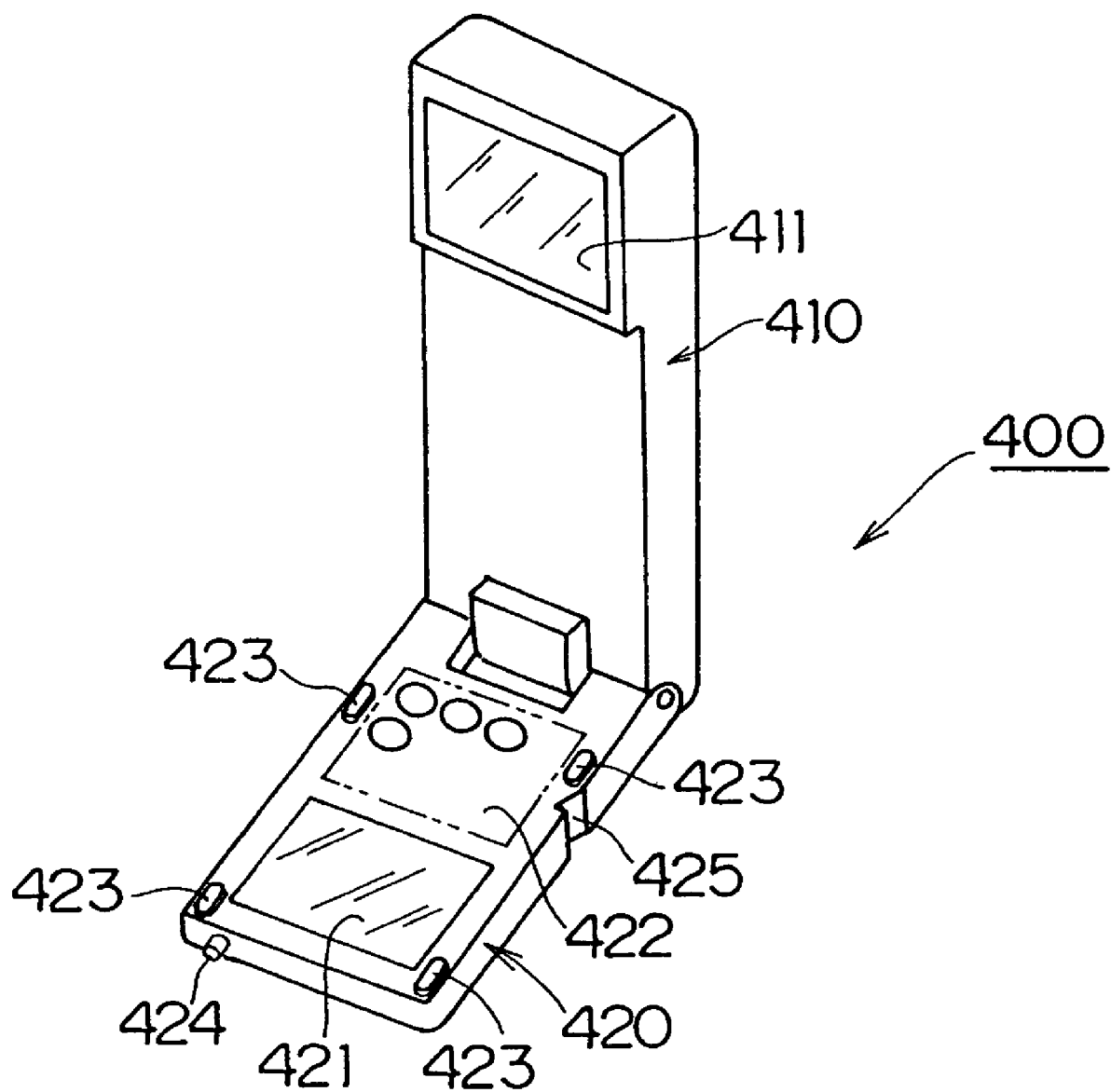
FIG. 27 is an appearance view of another cellular phone.
Figure 28:
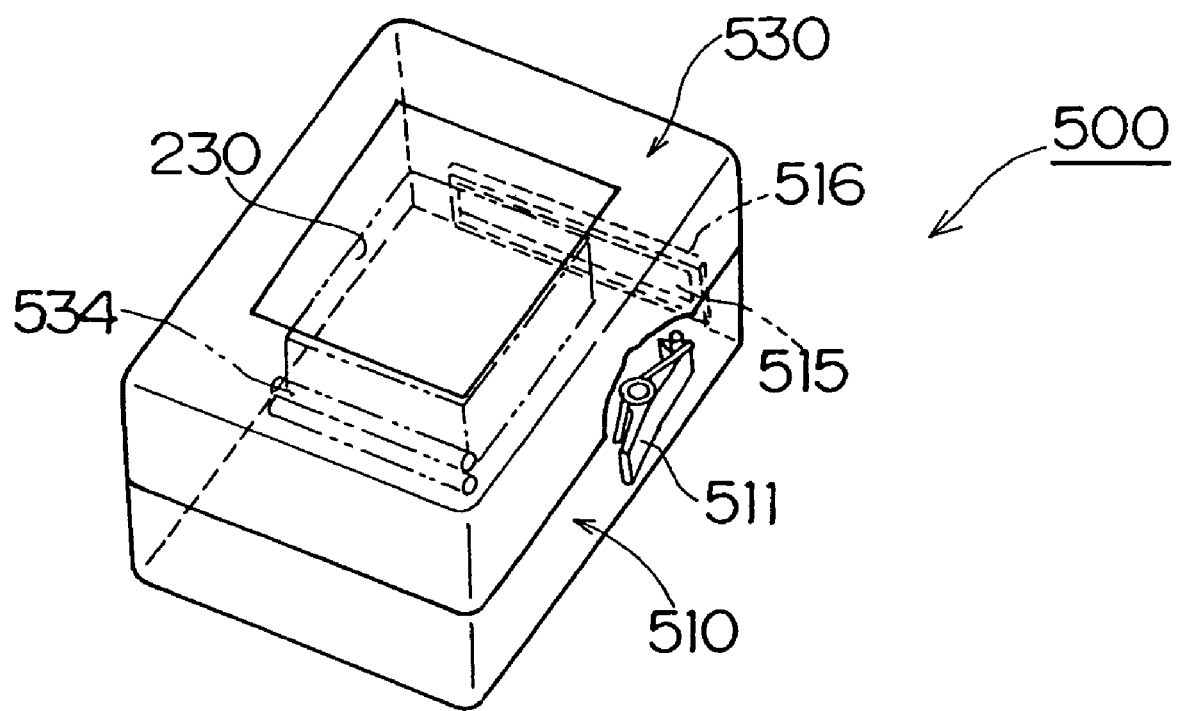
FIG. 28 is an appearance view of a portable printer that optically prints a screen displayed on an LCD of the cellular phone.
Figure 29:
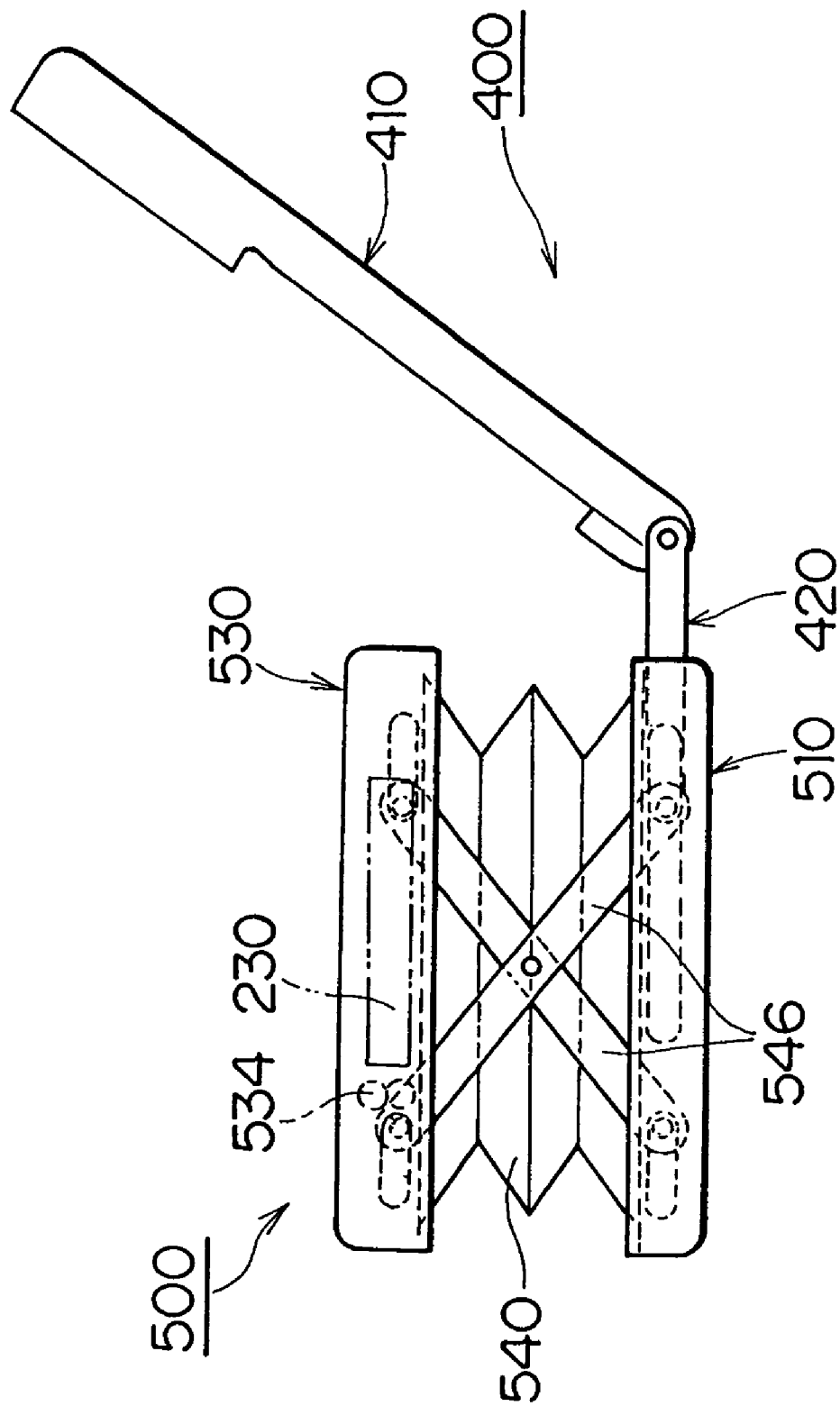
FIG. 29 is a side view showing the state in which a cover of the cellular phone is inserted in the portable printer.

FIGS. 27 and 28 are appearance views of the cellular phone 400 and the portable printer 500, respectively. FIG. 29 shows the state in which the LCD 421 of the cellular phone 400 is inserted in the portable printer 500.

As shown in FIG. 27, the cellular phone 400 is composed of a body 410 and a cover 420 jointed with each other through a hinge. The body 410 has a black-and-white LCD 411 that displays the communication information and the characters, and the cover 420 has the color light-transmission LCD 421 that displays the image and push buttons 422.

Four swells 423 are formed on the top of the cover 420 to guide the cover 420 into the printer 500, and a pin 424 and a notch 425 are formed on the front end and the side of the cover 420, respectively, to position the cover 420 in the printer 500.

As shown in FIG. 28, the portable printer 500 is composed of an LCD holding part 510 and an optical print part 530, and they are connected to each other through a bellows 540 and links 546 as shown in FIG. 29 so that they can get closer to and farther from each other. A lock 511 is provided on the side of the LCD holding 510 to position the cover 420 by coupling with the notch 425.

Figure 30:
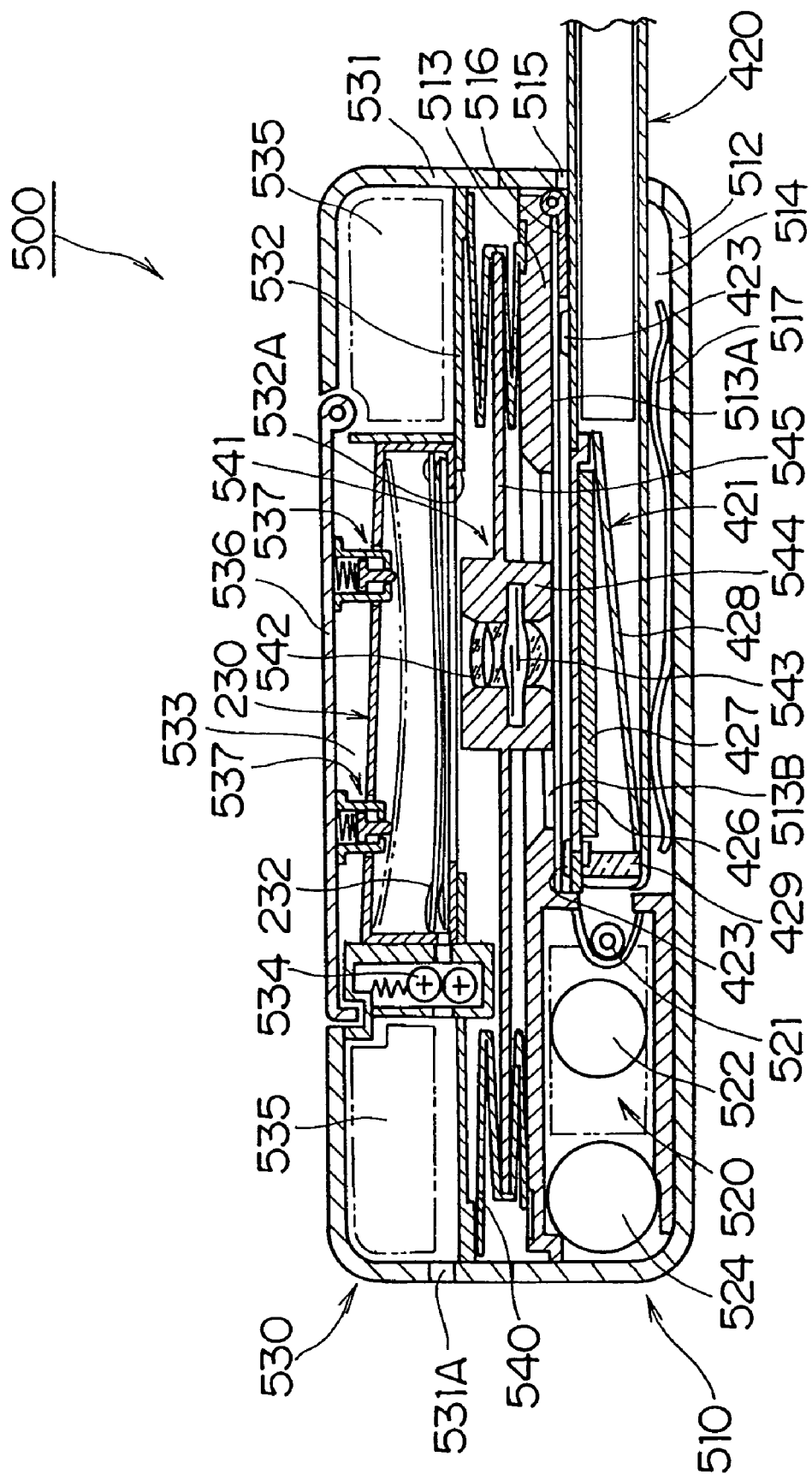
FIG. 30 is a section showing the state in which the cover of the cellular phone is inserted in the portable printer and a bellows is collapsed.
Figure 31:
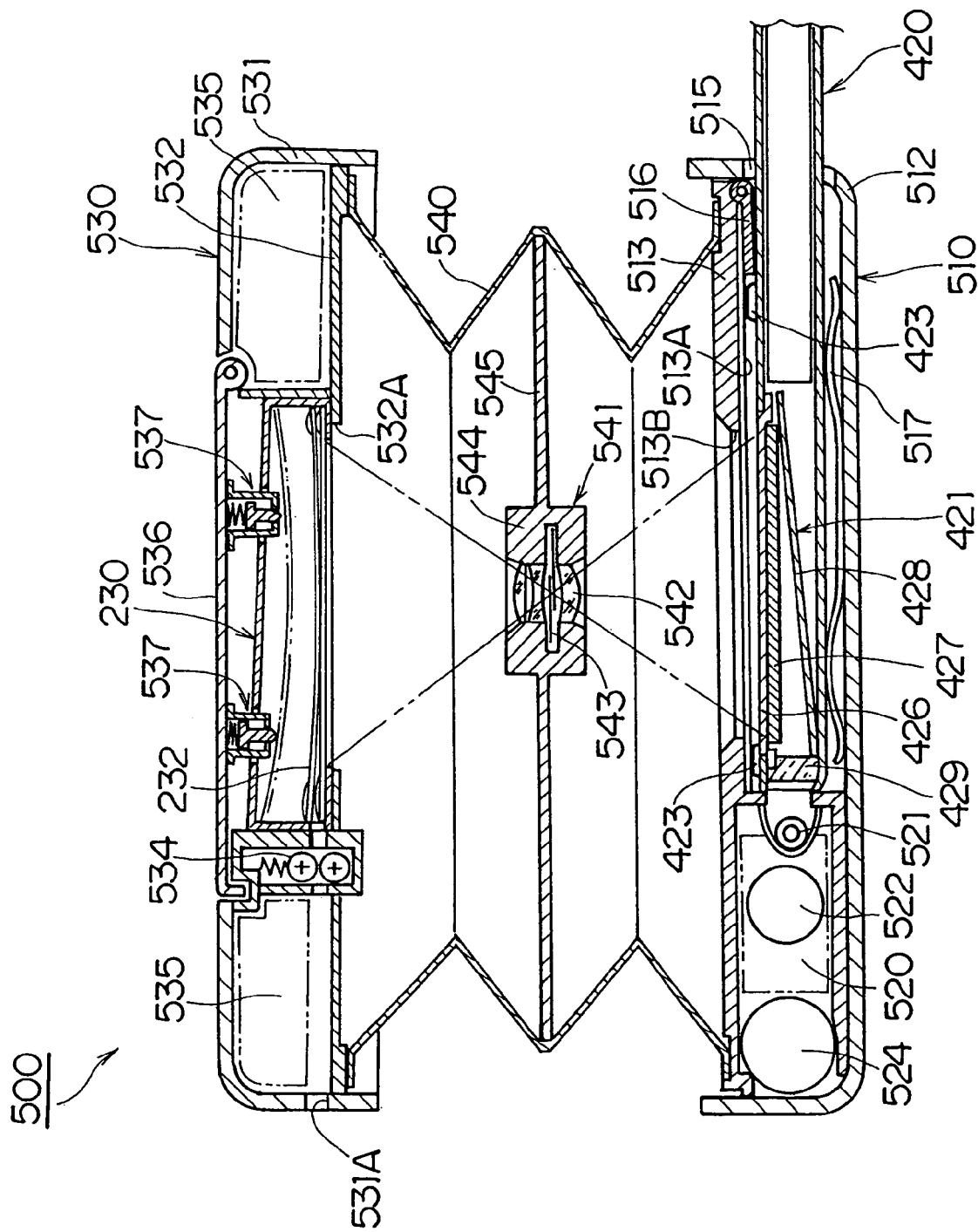
FIG. 31 is a section showing the state in which the cover of the cellular phone is inserted in the portable printer and the bellows is extended.

FIGS. 30 and 31 are sections showing states in which the LCD 421 of the cellular phone 400 is inserted in the portable printer 500. The bellows 540 is collapsed as shown in FIG. 30 when the printer 500 is being carried, and it is extended as shown in FIG. 31 at the printing.

As shown in FIGS. 30 and 31, a storage part 514 for the cover 420 with the LCD 421 is formed in a space enclosed by a casing 512 and an inner wall 513, and an electronic flash unit 520 and a battery 524 are provided in the space.

A mouth 515 for the cover 420 with the LCD 421 is formed in the casing 512, and a shade cover 516 is provided at the mouth 515 and pushed in such a direction as to close.

A plate spring 517 is provided at the bottom of the storage part 514 to push up the cover 420 with the LCD 421, and guide rails 513A are formed on the bottom of the inner wall 513 to guide the swells 423 on the cover 420. This precisely positions the LCD 421 at a shooting opening 513B in the inner wall 513 when the cover 420 is inserted in the storage part 514.

The electronic flash unit 520 is composed of an electronic flash 521 that emits a light to the storage part 514, a main capacitor 522 and an electronic flash controlling circuit (not shown).

The LCD 421 comprises a protect cover 426, a light-transmission liquid crystal panel 427, a reflecting plate 428 and an incident window 429 through which the light enters the LCD 421. The light emitted from the electronic flash 521 comes to the bottom of the liquid crystal panel 427 through the incident window 429 and the reflecting plate 428 to illuminate the liquid crystal panel 427. As shown in FIGS. 32(A) and 32(B), the ratio of an area in a reflecting surface 428A to the other area becomes higher from the left end to the right end of the reflecting plate 428. This evenly illuminates the whole liquid crystal panel 427. An ND filter in which the depth becomes lower from the left end to the right end may be attached to the bottom of the liquid crystal panel 427 instead of the reflecting plate 428.

A film pack chamber 533 is provided in a space enclosed by a casing 531 and an inner wall 532, and spread rollers 534 are provided in the space. A space denoted by reference numeral 535 contains a driving device for the spread rollers 534 and a claw mechanism, a controlling circuit, a battery and so on.

An ejecting slot 531A from which the instant print film 232 is ejected is formed in the casing 531, and a lid 536 that is opened when the film pack 230 is to be put in or taken from the printer 500. Two pressure parts 537 are provided on the inner surface of the lid 536 to press the film 232. An exposure opening 532A is formed in the inner wall 532 to expose the film 232.

As shown in FIG. 31, a lens part 541 is arranged in the center of the bellows 540. The lens part 541 is composed of a taking lens 542, a shutter 543, a support frame 544 that supports the taking lens 542 and the shutter 543, and a support plate 545 that supports the support frame 544 at the center of the bellows 540.

When the screen of the LCD 421 of the cellular phone 400 is to be optically printed on the film 232 by the printer 500, the cover 420 of the cellular phone 400 is inserted in the LCD holding part 510 of the printer 500, and the bellows 540 is extended. This positions the LCD 421 in the LCD holding part 510 and the film 232 at the exposure opening 532A of the optical print part 530 with respect to the lens part 541. Then, the electronic flash 521 emits the light while the shutter 543 is being controlled, and this optically prints the screen of the LCD 421 on the film 232.

After that, a feed part including the spread rollers 534 is driven to spread the developer in the film 232, and then the printed film 232 is ejected from the ejecting slot 531A.

This printer 500 does not need a light-emission head, a controlling device for driving the light-emission head, and so on to make less expensive than the printer 200, and it is suited to be carried since it can be collapsed.

The LCD 421 of the cellular phone 400 is a light-transmission LCD, but it may be a reflective LCD.

FIG. 33 is a section of a portable printer 550 that prints the screen of the reflective LCD 430. The same members as those in FIG. 31 are denoted by the same numerals, and they will not be explained again.

Only the electronic flash 521 among the electronic flash 521, the main capacitor 522 and the electronic flash controlling circuit is arranged on the support 544. Thus, the reflective LCD 430 can be illuminated from above.

In the embodiment, the light-transmission LCD or the reflective LCD that saves electricity is used. But, a display in which organic light-emitting devices are two-dimensionally arranged may be used. In this case, a light source is not needed since the light-emitting devices emit lights.

The exposure time of the shutter 543 is not necessarily controlled, and a light-emission time of the electronic flash 521, a light-emitting diode or the like may be controlled. In addition, though the shutter 543 for the shooting also works as a shade for the film 232, the shade cover 516 at the mouth 515 is effective.

As explained above, according to the present invention, the printer prints the image of the image data received by the portable communication terminal such as the cellular phone. The display of the portable communication terminal also works as the display for displaying the print information, and the control device of the portable communication terminal also works as the control device for inputting the print information. Thus, the printer does not need a display for displaying the print information and a control device for inputting the print information. This makes the printer smaller in size and less expensive. Also, this makes the operation easy since only the control device of the portable communication terminal is controlled.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable printer comprising:
a connecting mechanism that connects the portable printer to a portable communication terminal;
a second connector that is directly connected to a first connector of the portable communication terminal when the portable printer is connected to the portable communication terminal; and
a printer part that prints an image on a printer medium in accordance with image data input from the portable communication terminal via the first and second connectors;
wherein the connecting mechanism comprises a swell corresponding to a shape of a battery of the portable communication terminal, wherein the portable communication terminal is connected to the swell of the portable printer in a space created by detaching the battery of the portable communication terminal.

2. The portable printer as set forth in claim 1, wherein a power is supplied from the portable printer to the portable communication terminal when the connecting mechanism connects the portable printer to the portable communication terminal.

3. A portable printer comprising:
a connecting mechanism that connects the portable printer to a portable communication terminal;
a second connector that is directly connected to a first connector of the portable communication terminal when the portable printer is connected to the portable communication terminal; and
a printer part that prints an image on a printer medium in accordance with image data input from the portable communication terminal via the first and second connectors;
wherein the connecting mechanism includes a housing for housing a part of the portable communication terminal including the first connector, and the second connector is provided at an inner side of the housing, and
further comprising a battery capable of being attached and detached from the portable communication terminal so that the battery for the portable printer is an auxiliary battery for the portable communication terminal.

4. A portable printer, comprising:
a connecting mechanism for connecting the portable printer to a portable communication terminal;
a second connector that is connected to a first connector of the portable communication terminal via a cable; and
a printer part for printing an image on a print medium in accordance with image data input from the portable communication terminal via the first and second connectors; and
wherein the connecting mechanism comprises a swell corresponding to a shape of a battery of the portable communication terminal, wherein the portable communication terminal is connected to the swell of the portable printer in a space created by detaching the battery of the portable communication terminal.

5. A portable printer, comprising:
a connecting mechanism for connecting the portable printer to a portable communication terminal;
a second short distance wireless communication device capable of communicating wirelessly with a first short distance wireless communication device; and
a printer part for printing an image on a print medium in accordance with image data inputted from the portable communication terminal via the first and second short distance wireless communication devices; and
wherein the connecting mechanism comprises a swell corresponding to a shape of a battery of the portable communication terminal, wherein the portable communication terminal is connected to the swell of the portable printer in a space created by detaching the battery of the portable communication terminal.

6. The portable printer as set for the in claim 5, wherein the connecting mechanism comprises a mechanical connection for connecting the portable printer and the portable communication terminal.

7. A portable printer comprising:
a connecting mechanism that connects the portable printer to a portable communication terminal;
a second connector that is directly connected to a first connector of the portable communication terminal when the portable printer is connected to the portable communication terminal; and
a printer part that prints an image on a printer medium in accordance with image data input from the portable communication terminal via the first and second connectors;
wherein the connecting mechanism includes a housing for housing a part of the portable communication terminal including the first connector, and the second connector is provided at an inner side of the housing, wherein:
the print medium is an instant print film; and
the printer part includes a light emission head for exposing an image light onto the instant print film in accordance with the inputted image data, and an spread device for spreading the instant print film exposed by the light emission head to develop the instant print film.

8. A portable printer comprising:
a connecting mechanism that connects the portable printer to a portable communication terminal;
a second connector that is directly connected to a first connector of the portable communication terminal when the portable printer is connected to the portable communication terminal; and
a printer part that prints an image on a printer medium in accordance with image data input from the portable communication terminal via the first and second connectors;
wherein the connecting mechanism includes a housing for housing a part of the portable communication terminal including the first connector, and the second connector is provided at an inner side of the housing,
wherein the housing comprises a recess which accommodates at least one of a width and length of a housing that contains the portable communication terminal when the first and second connectors are connected to one another.

* * * * *